United States Patent
Mino et al.

(10) Patent No.: US 6,806,872 B2
(45) Date of Patent: Oct. 19, 2004

(54) VIDEO SIGNAL PROCESSING SYSTEM

(75) Inventors: Yoshiteru Mino, Hirakata (JP); Masayuki Masumoto, Sakai (JP)

(73) Assignee: Matsushita Electric Industrial Co., Ltd. (JP)

(*) Notice: Subject to any disclaimer, the term of this patent is extended or adjusted under 35 U.S.C. 154(b) by 417 days.

(21) Appl. No.: 10/116,142

(22) Filed: Apr. 5, 2002

(65) Prior Publication Data

US 2002/0145601 A1 Oct. 10, 2002

(30) Foreign Application Priority Data

Apr. 6, 2001 (JP) ........................................ 2001-107861

(51) Int. Cl.[7] ................................................ G09G 5/00
(52) U.S. Cl. ........................ 345/211; 345/212; 345/213; 345/214; 345/215; 345/503; 345/504; 382/236; 382/243; 386/112; 386/116; 386/119; 348/468; 348/761; 348/778
(58) Field of Search ................................. 345/211, 212, 345/213, 214, 215, 503, 504; 382/236, 243; 386/112, 116, 119; 348/468, 761, 778

(56) References Cited

U.S. PATENT DOCUMENTS

| | | | | |
|---|---|---|---|---|
| 5,058,041 A | | 10/1991 | Rosse et al. ................ | 364/521 |
| 5,446,840 A | | 8/1995 | Kiuchi et al. ............... | 395/164 |
| 6,011,592 A | * | 1/2000 | Vaughan et al. ............ | 348/552 |

FOREIGN PATENT DOCUMENTS

| | | |
|---|---|---|
| JP | 63-143590 | 6/1988 |
| JP | 1-233970 | 9/1989 |
| JP | 5-313623 | 11/1993 |
| JP | 11-196347 | 7/1999 |

* cited by examiner

*Primary Examiner*—Xiao Wu
*Assistant Examiner*—Abbas Abdulselam
(74) *Attorney, Agent, or Firm*—Parkhurst & Wendel, L.L.P.

(57) ABSTRACT

It cannot be ensured that display setting changes are made at once in a system in which the number of display settings for a display processing apparatus is extremely large, an application is running under an operating system and display setting register change time is unpredictable from the application due to another task, or an internal configuration is incapable of immediately reflecting access from a host CPU to a display setting register. According to the present invention, outputs of a plurality of first display setting registers mapped into an address space for temporarily holding display setting data generated and outputted by a host CPU under control of a write control signal are connected to inputs of a plurality of second display setting registers holding display setting parameters referenced by display output module. Timing of a write into the second display setting registers is controlled by using a vertical sync signal and output from a display control register temporarily holding display control information generated and outputted by the host CPU, thereby allowing display settings to be reliably updated at once and allowing display outputs to be matched with the display settings without degrading system performance.

11 Claims, 19 Drawing Sheets

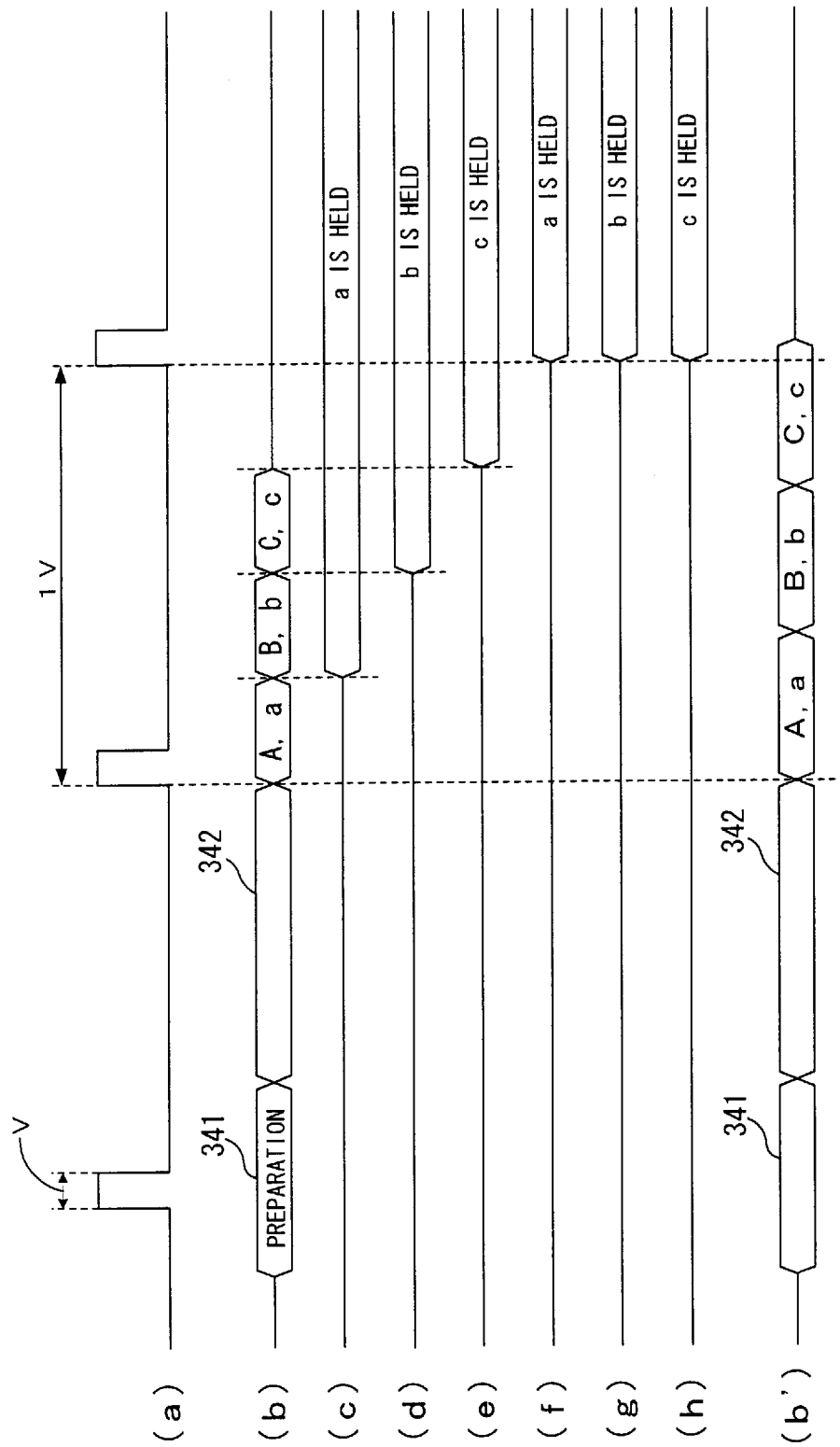

US 6,806,872 B2

VIDEO SIGNAL PROCESSING SYSTEM

FIELD OF THE INVENTION

The present invention relates to a video signal processing system comprising a display output module for digitally processing a video signal that is controlled by a host CPU.

BACKGROUND OF THE INVENTION

Traditionally, a display output module for handling a digital video signal has been controlled in central processing performed by a host CPU.

When the host CPU updates display setting data, the updated data should be inputted into the display output module during a non-display period. The non-display-period can be identified by using a vertical sync signal.

If display setting data were changed during a display period, then that would be perceived by a user as degradation in image quality or screen flickering, because the display settings are immediately reflected in the display output module. As solutions to this problem, digital signal processing circuit controllers are disclosed in Japanese Patent Laid-Open No. 63-143590 and Japanese Patent No. 2752082.

The technology disclosed in Japanese Patent Laid-Open No. 63-143590 provides the following configuration.

A display output module includes first display setting registers, second display setting registers, a display processing circuit, and an enable bit indicating that the second display setting register is update-enabled. A host CPU negates the enable bit when data is written into the first display setting registers.

Then, changes to display settings are sequentially written into the first display setting registers. After the display settings are written into the first registers, the enable bit is asserted.

When the enable bit is asserted and a vertical sync signal indicates a non-display period, the second display setting register is loaded with an output from the first display setting registers and outputs it to the display processing circuit.

FIGS. 18 and 19 shows a technology disclosed in Japanese Patent No. 2752082.

As shown in FIG. 18, a display output module includes flip-flops 323–325, which are first display setting registers, flip-flops 327–329, which are second display setting registers, and a digital video signal processing circuit 326, which is a display processing circuit. A microcomputer 321, which is a host CPU, inputs a vertical sync signal to change display settings and updates values in the first display setting registers in one vertical synch signal period.

The inputs of the second display setting registers are connected to the outputs of the first display setting registers. The second display setting registers are loaded with outputs from the first display setting registers in synchronization with the vertical sync signal and output it to the display processing circuit.

The microcomputer 321 and a decoder 322 in FIG. 18 are interconnected through a bus 330 to send and receive control data and address data to and from each other. The D-flip-flops 323, 324, and 325 are connected with the decoder 322 through a data line 331 and receive the control data and receive a selection signal through signal lines 332A, 332B, and 332C.

Symbol "a" in FIG. 19 indicates the vertical sync signal, "V" indicates a vertical synch signal period, and "1V" indicates a vertical scan period. Symbol "b" indicates an operation of the microprocessor 321, symbols "c", "d", and "e" indicate an operation of the D-flip-flops 323, 324, and 325, respectively, and symbols "f", "g", and "h" indicate operations of the D-flip-flops 327, 328, 329, respectively.

Period 341 indicated by "b" in FIG. 19 is a preparation period. The preparation is for setting control data and address data in a predetermined register of the microcomputer 321. Period 342 is for monitoring an incoming vertical sync signal and, when the vertical sync signal is detected, obtaining it. Thus, the microcomputer 321 can know the point of the vertical sync signal.

FIG. 19 shows a timing chart, in which symbol "all" indicates control data transferred to D-flip-flop 323 together with address data at address A, "b" indicates control data transferred to D-flip-flop 324 together with address data at address B, and "c" indicates control data transferred to D-flip-flop 325 together with address C. The time chart shows the transfer of data A, a, B, b, and C, c mentioned above.

As described above, display setting data input into the display processing circuit is updated with the timing of a vertical sync signal in either of these control methods for display setting.

However, the above-described prior arts have the following problems.

The first problem is that the host CPU must generate an interrupt to input the vertical sync signal or means such as polling to a flag in which the vertical sync signal is reflected in order for the host CPU to control the generation or modification of display setting data.

In particular, the vertical sync signal is not associated with display setting changes in the display setting control method described in Japanese Patent Laid-Open No. 63-143590. In a video signal processing system that requires frequent display setting changes, there is the likelihood that the host CPU cannot know a display setting change and the next display setting change occurs before the host CPU detects the display setting change and, as a result, a plurality of display setting changes are made in one display period starting with a vertical sync signal and only the last display setting change is reflected on display. To avoid this problem, the host CPU must perform control in synchronization with the vertical sync signal.

The second problem is that the cycle for a change to display setting data must be started by the host CPU in synchronization with the vertical sync signal and the change must be made in a non-display period.

Specifically, an embodiment of the display setting control method is described in Japanese Patent No. 2752082 in which a host CPU inputs the vertical sync signal as an interrupt signal to prepare update data to be placed in the first display setting register and starts a write access to the first display setting register.

As shown at b' in FIG. 19, however, if the vertical sync signal makes a transition during the access by the host CPU for changing the display setting data, a part of display setting data to be changed is not updated before a display period starts, thus the display output module outputs display setting data being updated together with updated display setting data.

While proper display setting data is displayed eventually after a number of vertical sync signal transitions take place and all display setting data is settled, degraded image quality is provided during progress of the update.

To address this problem, a method has been disclosed for dividing the vertical sync signal to prolong a display setting update interval.

However, this control method cannot ensure that display setting changes are made at once in a system in which the amount of display setting data is very large because of diversified digital signal processing, a system in which an application is running under an operating system and display setting register change time is unpredictable from the application due to another task, or a system having an internal configuration in which access from the host CPU to a display setting register is not immediately reflected.

A requirement common to the first and second problems is that the host CPU must monitor a vertical sync signal in controlling display setting. Therefore, the execution of an application software program is interrupted by the vertical sync signal, degrading the performance of the system.

There is another problem that because only a part of display setting data is changed or different display setting data changes are periodically performed and the data must be set by the host CPU in the display module each time a change is made, the number of cycles consumed by a host CPU for controlling a display output module is increased.

DISCLOSURE OF THE INVENTION

It is an object of the present invention to provide a video signal processing system that can ensure that display settings are updated at a time and can synchronize the display settings with display outputs without degrading the performance of the system.

It is another object of the present invention to provide a video signal processing system that can improve versatility concerning video setting changes made by a host CPU.

The present invention set forth in claim 1 provides a video signal processing system provided between a host CPU and a monitor to update display setting data by the CPU, the video signal processing system comprising: a first display setting register mapped into an address space for temporarily holding various display setting data under the control of a write control signal, the display setting data being generated and outputted asynchronously with a vertical sync signal; a decoder for generating the write control signal associated with the first display setting register for address access; a second display setting register into which an output from the first display setting register is inputted for updating data held in the second display setting register in synchronization with a first control signal; a display output module for performing digital processing of a video display signal according to an output from the second display setting register; and a display setting start flag register in which a display setting start flag generated and outputted asynchronously with the vertical sync signal is set; wherein the first control signal is generated by using the vertical sync signal and an output from the display setting start flag register and a display setting end flag register is provided for notifying the host CPU of the completion of update of the second display setting register.

The present invention set forth in claim 2 provides a video signal processing system provided between a host CPU and a monitor to update display setting data by the CPU, and the video signal processing system comprising: first display setting registers and second display setting registers mapped into an address space for temporarily holding various display setting data under the control of write control signals, the display setting data being generated asynchronously with a vertical sync signal; a decoder for generating the write control signals associated with the plurality of first and second display setting registers for address access; selectors for switching between outputs according to an input, the input being a pair of outputs of the first and second display setting registers; a display output module for performing digital signal processing of a video display signal according to an output from the selector; and a selector selection signal generator for controlling the switching performed by the selectors, the selector selection signal generator comprising a display control register having a first and second fields for temporarily holding display control information generated and outputted asynchronously with a vertical sync signal, and a flip-flop for holding an output from the second field with the timing of the vertical sync signal and the first field; wherein the switching performed by the selectors is controlled by an output signal from the flip-flop and display setting control data is set in the first and second fields under the control of a write strobe line, the write strobe line being the output of the decoder.

The present invention set forth in claim 3 provides the video signal processing system according to claim 1, comprising a display control index register having fields corresponding to each of the plurality of second display setting registers into which an output from the first display setting registers is inputted for updating data held in the second display setting register in synchronization with a first control signal, wherein the first control signal corresponding to each of the plurality of second display setting registers is generated by using an output form the display control index register and the vertical sync signal, and the second display setting registers are updated by the first control signal.

The present invention set forth in claim 4 provides the video signal processing system according to claim 2, comprising a display control index register having fields, each of the fields corresponding to each of the plurality of selectors, wherein the first control signals corresponding to the plurality of selectors are generated by using an output form the display control index register and the vertical sync signal, and the selectors select and provide the output of the first display setting register or the output of the second display setting registers according to the first control signals.

The present invention set forth in claim 5 provides a video signal processing system provided between a host CPU and a monitor to update display setting data by the CPU, the video signal processing system comprising: a plurality of pairs of first display setting register and second display setting register, each of the pairs being assigned to one address; a decoder for generating a plurality of write control signals associated with the plurality of pairs for address access; a display control register for temporarily holding display control information externally generated and outputted asynchronously with a vertical sync signal; and a plurality of selectors for selecting an output from among outputs of the first display setting registers and the second display setting registers inputted into the selectors and outputting the output to a display output module; wherein the first and second display setting registers select and hold display setting data generated by a host CPU asynchronously with the vertical sync signal according to the first control signal and the write control signals; the selectors select the output from among the outputs of the first display setting registers and the second display setting registers and output the selected output to the display output module in synchronization with a second control signal; and the first and second control signals are generated by using the vertical sync signal and an output from the display control register.

The present invention set forth in claim 6 provides the video signal processing system according to any of claims 2, 4, and 5, comprising means for providing information about input switching performed by the plurality of selectors to an external element.

The present invention set forth in claim 7 provides a video signal processing system provided between a host CPU and a monitor to update display setting data by the CPU, the video signal processing system comprising: a plurality of first display setting registers mapped into an address space for temporarily holding various display setting data externally generated and outputted asynchronously with a vertical sync signal under the control of a write control signal; display setting start flag register in which a display setting start flag indicating the completion of access to the plurality of first display setting registers is set, the display setting start flag being externally set asynchronously with the vertical sync signal; a register setting controller for performing register access by using the display setting start flag and vertical sync signal; a plurality of second display setting registers mapped into an address space for holding the display setting data under the control of a write control signal, the data being updated by the register setting controller; a decoder for generating a plurality of the write control signals corresponding to the plurality of second display setting registers for address access; a display setting end flag indicating the completion of update of the second display setting registers; and a display output module for performing digital processing of a video display signal according to an output from the plurality of second display setting registers; wherein the register setting controller uses data in the plurality of first display setting registers to update the plurality of second display setting registers during a vertical synchronization period.

The present invention set forth in claim 8 provides a video signal processing system provided between a host CPU and a monitor to update display setting data by the CPU, the video signal processing system comprising: a plurality of first display setting registers mapped into an address space for temporarily holding various display setting data externally generated and outputted asynchronously with a vertical sync signal under the control of a write control signal; a frame count detector for providing an output indicating whether the current frame matches a frame count in a frame count setting register; a register setting controller performing register access by using a display setting start flag indicating the completion of access to the plurality of first display setting registers and the vertical sync signal, the display setting start flag being externally set asynchronously with the vertical sync signal; a plurality of second display setting registers mapped into an address space for holding the display setting data under the control of a write control signal, the data held in the plurality of second display setting registers being updated by the register setting controller; a decoder for generating a plurality of the write control signals corresponding to the plurality of second display setting registers for address access; and a display setting end flag indicating the completion of update of the second display setting registers; display output module for performing digital processing of a video display signal according to an output from the plurality of second display setting registers wherein, the frame count detector comprises: a frame count setting register externally set asynchronously with the vertical sync signal for indicating update intervals of the plurality of first display setting registers; a frame counter for counting frames by using the vertical sync signal; and a comparator for comparing an output from the frame count setting register with an output from the frame counter to determine whether the current frame matches the frame count in the frame count setting register, wherein, the register setting controller and the frame count detector are constituted so that the register setting controller initializes the frame counter according to a setting in the display setting start flag and the frame count detector holds the frame counter and provides the vertical sync signal to the register setting controller until the display setting end flag is set after the output from the frame counter matches the output from the frame count setting register.

The present invention set forth in claim 9 provides a video signal processing system provided between a host CPU and a monitor to update display setting data by the CPU, the video signal processing system comprising: a plurality of first display setting registers mapped into an address space for temporarily holding various display setting data under the control of a write control signal, the display setting data being externally generated and outputted asynchronously with a vertical sync signal; a display setting start flag register in which a display setting start flag indicating the completion of access to the plurality of first display setting registers is set, the display setting start flag being externally set asynchronously with the vertical sync signal; a display setting selection register for indicating that the nth set of ones of the plurality of first display setting registers is used, the display setting selection register being externally set asynchronously with the vertical sync signal; a register setting controller for performing register access by using the display setting start flag and vertical sync signal; a plurality of second display setting registers mapped into an address space for holding the display setting data under the control of a write control signal, the data held in the plurality of second display setting registers being updated by the register setting controller; a decoder for generating a plurality of the write control signals corresponding to the plurality of second display setting registers for address access; and a display output module for performing digital processing of a video display signal according to an output from the plurality of second display setting registers; wherein, the first display setting registers are capable of holding a plurality of sets of data held in the second display setting registers; and the register setting controller uses data in a plurality of ones of the first display setting registers according to data set in the display setting selection register to update the second display setting registers.

The present invention set forth in claim 10 provides a video signal processing system provided between a host CPU and a monitor to update display setting data by the CPU, the video signal processing system comprising: a first display setting register mapped into an address space for temporarily holding various display setting data under the control of a write control signal, the display setting data being externally generated and outputted asynchronously with a vertical sync signal; a display setting start flag register in which a display setting start flag indicating the completion of access to the first display setting registers is set, the display setting start flag being externally set asynchronously with the vertical sync signal; register setting controller for performing register access by using the display setting start flag and vertical sync signal; a data bus used by the register setting controller and the host CPU for accessing the first display setting register; a data bus arbiter for controlling the use of the data bus; a second display setting registers mapped into an address space for holding the display setting data under the control of a write control signal, the data held in the plurality of second display setting registers being updated by the register setting controller; a decoder for generating a plurality of the write control signals corresponding to the plurality of second display setting registers for address access; and a display output module for performing digital processing of a video display signal according to an output from the plurality of second display setting registers; wherein the data bus arbiter is constituted so as to change the bus priority of the register setting controller to the highest priority in vertical synchronization periods.

The present invention set forth in claim 11 provides a video signal processing system provided between a host CPU and a monitor to update display setting data by the CPU, the video signal processing system comprising: a plurality of pairs of first display setting register and second display setting register, each of the pairs being assigned to one address; a decoder for generating a plurality of write control signals corresponding to the plurality of pairs for address access; a display control register for temporarily holding display control information externally generated and outputted asynchronously with a vertical sync signal; a plurality of selectors for selecting an output from among outputs from the first display setting registers and the second display setting registers inputted into the selectors and outputting the output to a display output module; wherein it is constituted so that the first and second display setting registers select and hold various display setting data generated asynchronously with the vertical sync signal by a host CPU according to the write control signals, a control signal generated by using an output of the display control register and the vertical sync signal; the selectors select the output from among the outputs from the first display setting registers and the second display setting registers and output the selected output to a display output module in synchronization with the vertical sync signal and the control signal generated by using the output of the display control register; and the first and second display setting registers are mutually exclusively selected to be updated by the host CPU and the first and second display setting registers are mutually exclusively selected by the selectors.

BRIEF DESCRIPTION OF THE DRAWINGS

FIG. 19 shows a timing chart of the prior art.

DESCRIPTION OF THE EMBODIMENTS

Embodiments of the present invention will be described below with respect to FIGS. 1 through 17.

(First Embodiment)

Figure 1:
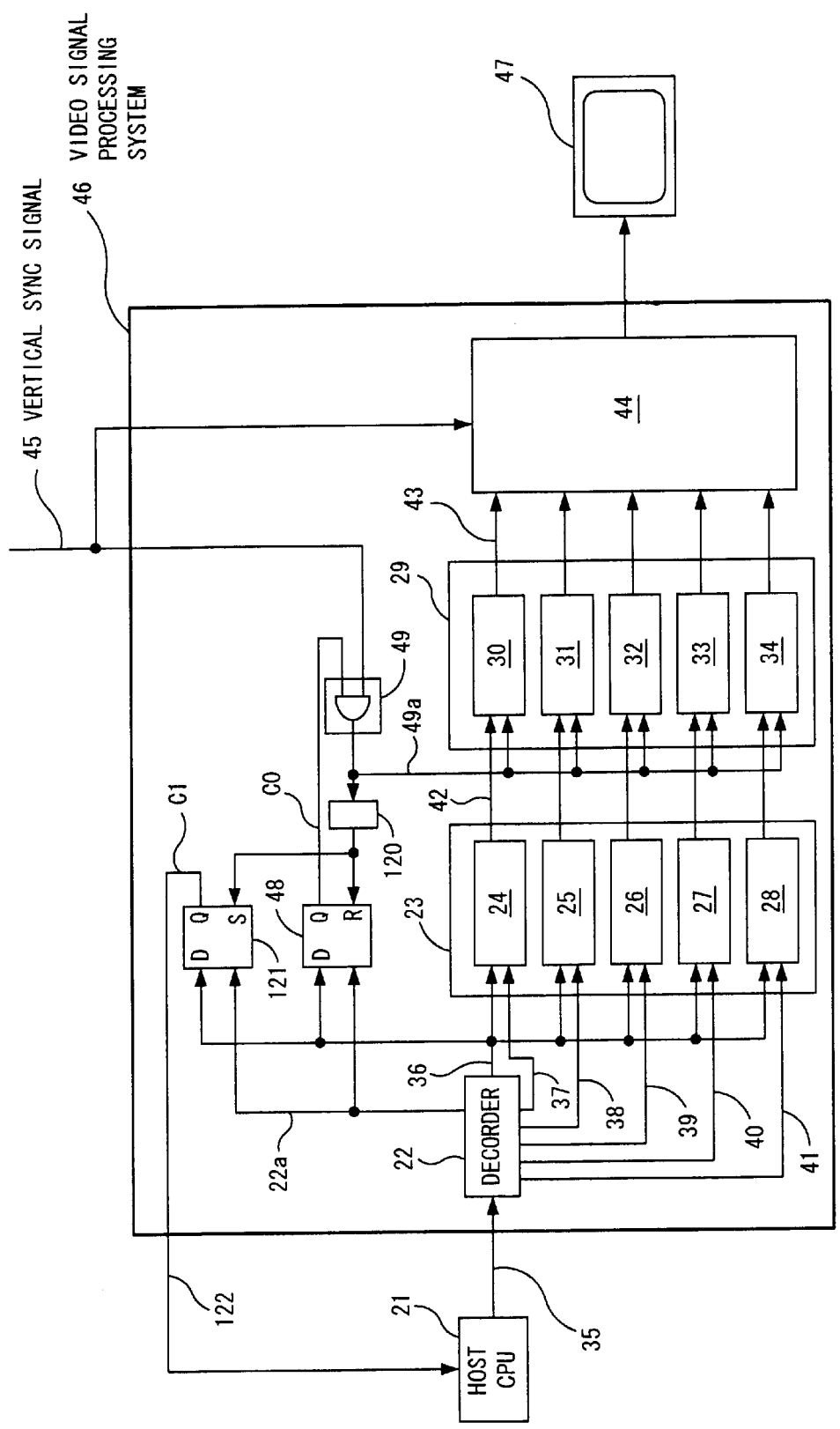
FIG. 1 shows a block diagram of a video signal processing system according to a first embodiment of the present invention.
Figure 2:
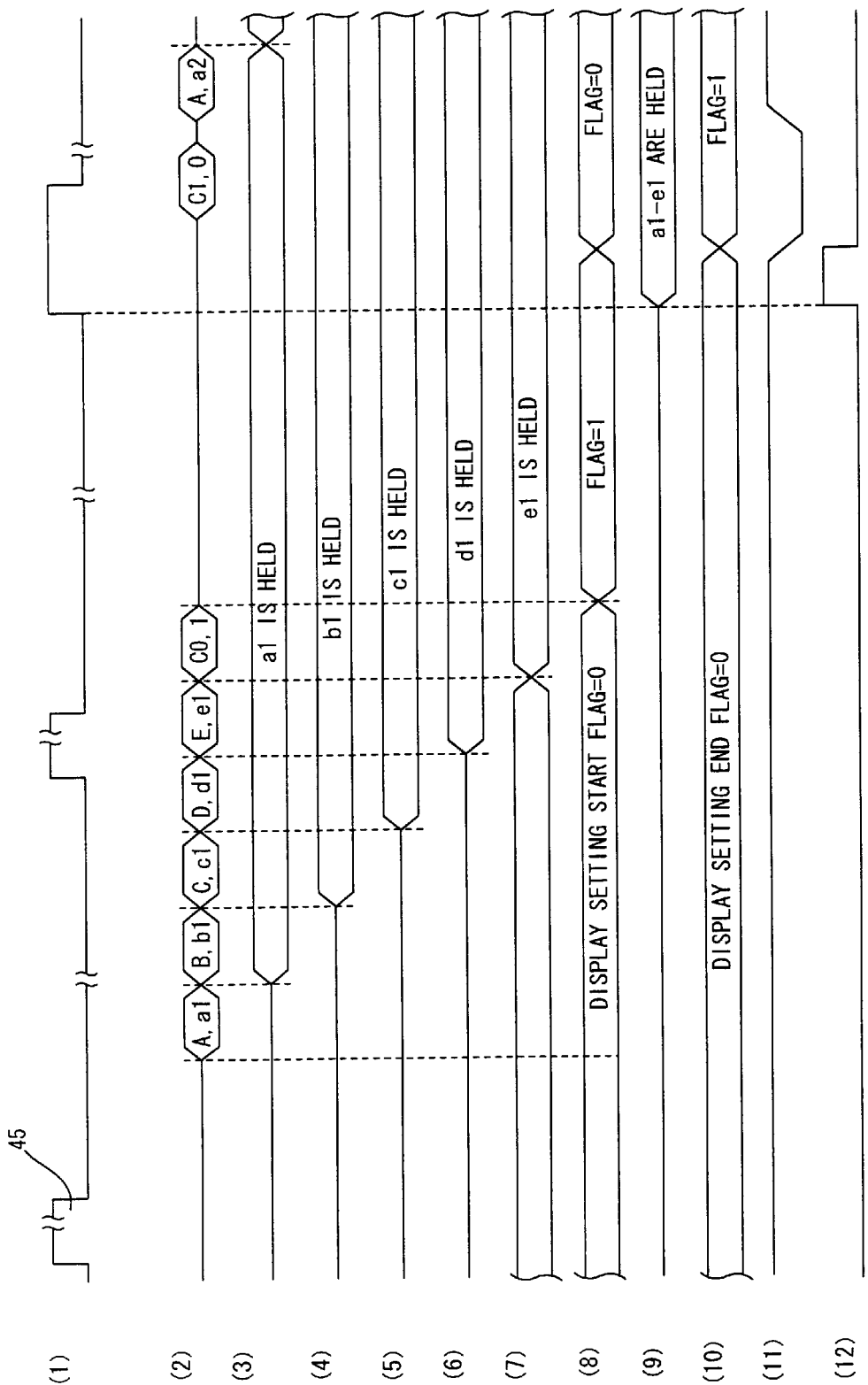
FIG. 2 shows a control timing diagram of a host CPU and the video signal processing system according to the first embodiment.

FIGS. 1 and 2 show a first embodiment of the present invention.

FIG. 1 shows a video signal processing system according to the first embodiment of the present invention.

The video signal processing system 46 is provided between a host CPU 21 and a monitor 47 and includes the following components.

Reference number 22 indicates a decoder, 23 indicates a first group of control registers, 29 indicates a second group of control registers, 35 indicates a control data and address data line from the host CPU 21 to the decoder 22, 36 indicates a control data line from the decoder 22 to the first group of control registers, 37–41 indicate write control signals from the decoder 22 to the first group of control registers, 42 indicates a register output of the first group of control registers, 43 indicates a register output of the second group of control registers, 44 indicates a display output module, 45 indicates a vertical sync signal inputted from an external source, 48 indicates a display setting start flag register, and 49 indicates a first control signal generator which is formed, for example, by a two-input AND gate. Reference number 120 indicates a delay circuit, 121 indicates a display setting end flag register, and 122 indicates an interrupt control signal to the host CPU 21.

The first control register group 23 is made up of display setting registers 24–28. The second control register group 29 is made up of display setting registers 30–34.

Reference number 22a indicates a write strobe line, which is an output of the decoder 22 and coupled to the display setting start flag register 48 and the display setting end flag register 121.

The configuration of the video signal processing system 46 will be described with reference to the timing diagram shown in FIG. 2.

Chart 1 in FIG. 2 represents timing of the vertical sync signal 45, chart 2 represents access states of the host CPU 21, charts 3–7 represent data hold timing of the first display setting registers 24–28, chart 8 represents output timing of a value C0 outputted from the display setting start flag register 48, chart 9 represents data hold timing of setting the second display setting registers 30–34, chart 10 represents output timing of a value C1 outputted from the display setting end flag register 121, chart 11 represents output timing of an output value of the interrupt control signal 122, and chart 12 represents output timing of a first control signal 49a for the output of the first control signal generator 49.

On chart 2 representing the access states of the host CPU 21, symbol "A, a1", indicates that the CPU writes display setting data a1 into a display setting register allocated to address A. Symbols A–E correspond to the first display setting registers 24–28. Symbol "C0, 1" represents that a flag is set in the display setting start flag register 48 and "C1, 0" represents that a flag in the display setting end flag register 121 is reset (cleared).

When the host CPU 21 detects a setting change request from a user or a request for a display setting change from an application, it generates display setting data and outputs it to the video signal processing system 46 through the control data and address data line 35.

An address is assigned to each of the first display setting registers 24–28 in the video signal processing system 46. The decoder 22 decodes an address access from the host CPU 21 and asserts a write control signal for a write into a corresponding first display setting register.

The host CPU 21 analyzes setting changes provided by the user or the application to generates setting change data sequentially.

The first control signal generator 49 at this point of time uses a vertical sync signal 45 and the display setting start flag=0 outputted from the register 48 to output a negate signal for the write control signal of the second display setting registers 30–34, therefore the values in the second display setting registers are not updated.

Display setting data a1 is written into first display setting register 24 at the timing of "A, a1" indicated on chart 3.

Subsequently, accesses "B, b1", "C, c1", "D, d1", and "E, e1" are sequentially performed and data is written at timings indicated on charts 4–7.

The vertical sync signal goes high again during accesses from "A, a1" through "E, e1". However, because the register 48 has outputted the display setting start flag=0 as shown on chart 8, the second group 29 of control registers are not updated at this timing of the vertical sync signal.

The host CPU 21 requests the video signal processing system 46 to make a batch change to the second control register group 29 at "C0, 1" after the completion of the display setting changes to the first control register group 23.

The register 48 outputs the display setting start flag =1 at this timing. However, because the vertical sync signal has become low, which indicates a display period, the second control register group 29 is not updated.

Then, when the vertical sync signal changes from low to high, the first control signal generator 49 generates a write control signal for a write into the second display setting registers 30–34 by using the vertical sync signal 45 and the output from the register 48, and outputs of the first display setting registers 24–28 are inputted into the second display setting registers 30–34 at once to update the data in them.

The display output module 44 provides to the monitor 47 digital signal processing settings updated according to the changes made to the outputs of the second control register group 29, including a register output 43 of the second display setting register 30.

At the same time, the write control signal controlling the write to the second display setting registers 30–34 is delayed by the delay circuit 120, then inputted to the reset terminal of the register 48 to reset the output of the register 48 and is inputted into the set terminal of the register 121. Then the display setting end flag C1 is outputted at the timing indicated on chart 10 and the interrupt control signal 122 is asserted at the timing indicated on chart 11.

The host CPU 21 detects the assertion of the interrupt control signal 122 and clears the display setting end flag by write access indicted by "C1, 0".

Then, the next time a setting change is needed, write access to display setting data to be updated is started.

In this way, the host CPU 21 can change display settings at a time in synchronization with the vertical sync signal 45 without regard to a vertical synchronization period for write access to the first display setting registers 24–28 for changing display setting.

Thus, no display output occurs with a combination of setting values different from the change of display setting required by the user or application, which is not ensured by the display setting method described in Japanese Patent No. 2752082, can reliably controlled.

The sequentiality of the display settings can be ensured by informing the host CPU 21 of the completion of a display update.

While the configuration has been described in which the completion of the display setting is indicated to the host CPU 21 by the interrupt signal, the display setting may be controlled by the host CPU 21 polling the display setting end flag in the display setting end flag register 121.

(Second Embodiment)

Figure 3:
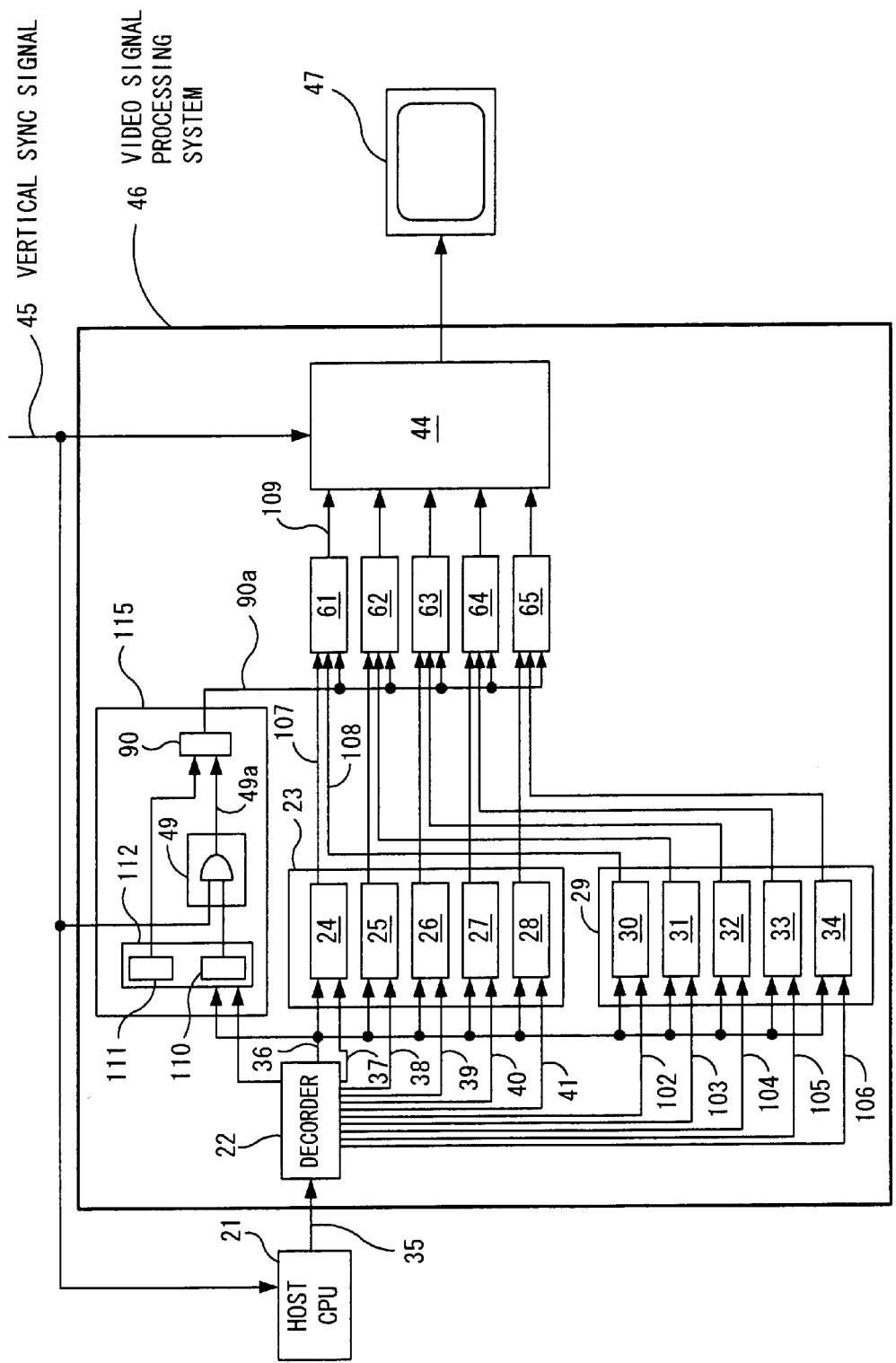
FIG. 3 shows a block diagram of a video signal processing system according to a second embodiment of the present invention.
Figure 4:
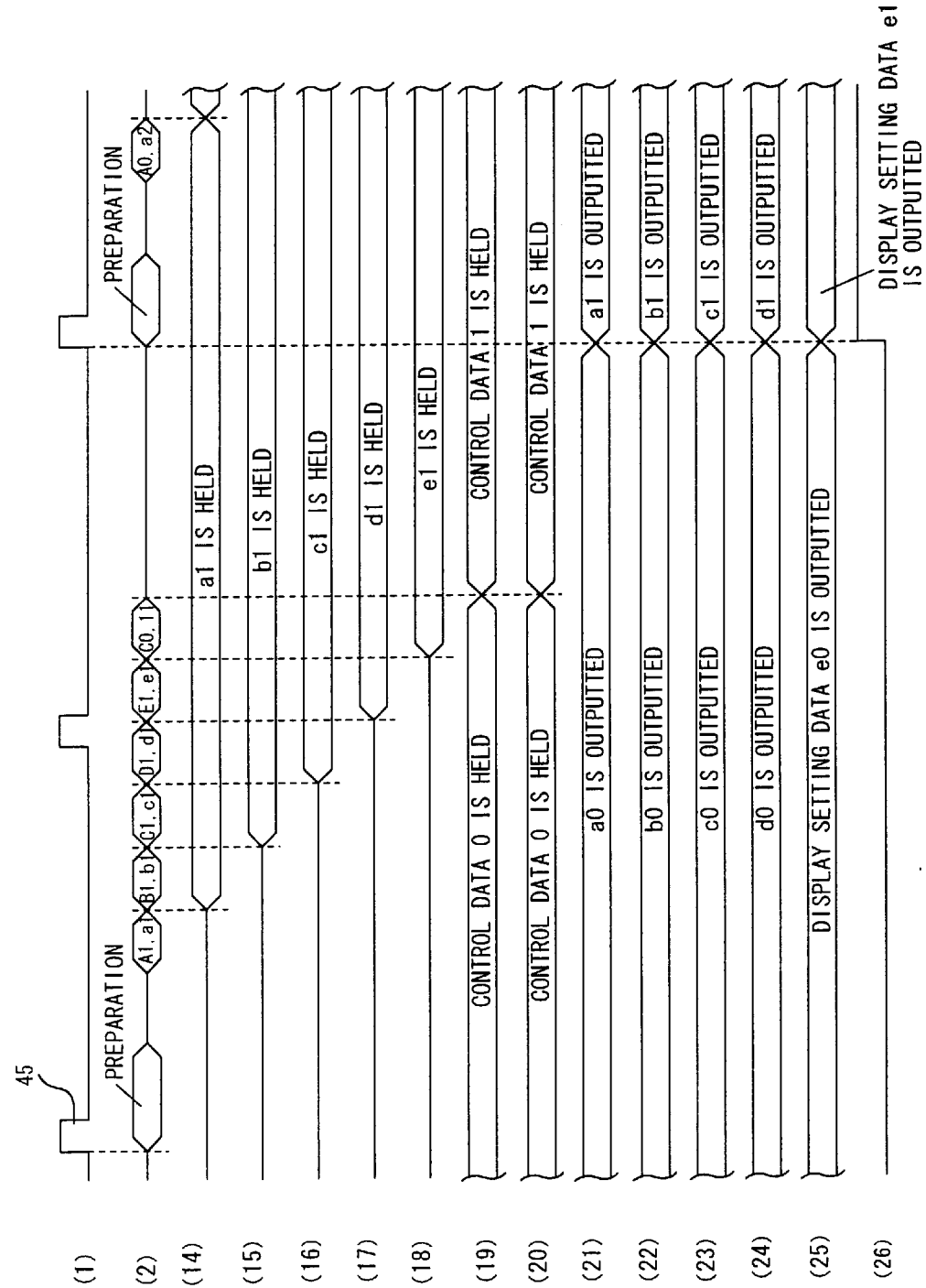
FIG. 4 shows a control timing diagram of a host CPU and the video signal processing system according to the second embodiment.

FIGS. 3 and 4 show a second embodiment of the present invention.

Elements that have the same effects as those of the elements of the first embodiment of the present invention are labeled with the same reference numbers.

FIG. 3 shows a video signal processing system according to the second embodiment of the present invention. Differences from the first embodiment are that write control signals 102–106 for a write to second display setting registers 30–34 are output from a decoder 22 and there are provided selectors 61–65 into which outputs from first display setting registers 24–28 and outputs from the second display setting registers 30–34 are inputted, a display control register 112 having fields 110 and 111, and a flip-flop 90 for holding a state of the field 111 with the timing of a vertical sync signal 45 and field 110. Reference number 115 indicates a generator for generating a selector selection signal provided to the selectors 61–65.

A configuration of the video signal processing system 46 will be described with respect to a timing diagram shown in FIG. 4.

Chart 1 in FIG. 4 represents timing of the vertical sync signal 45, chart 2 represents access of the host CPU, chart 14 represents data hold timing of second display setting register 30, chart 16 represents data hold timing of second display setting register 32, chart 17 represents data hold timing of second display setting register 33, chart 18 represents data hold timing of second display setting register 34, chart 19 represent data hold timing of the field 111 of the display control register 112, chart 20 represents data hold timing of field 110 of the display control register 112, chart 21 represents data output timing of the selector 61, chart 22 represents data output timing of the selector 62, chart 23 represents data output timing of the selector 63, chart 24 represents data output timing of the selector 64, chart 25 represents data output timing of the selector 65, and chart 26 represents timing of an output signal 90a of the flip-flop 90.

On chart 2, which indicates the access state of the host CPU 21, symbol "C0, 11" indicates that "1" is set in field 110 of the display control register 112 and "1" is set in field 111. Symbols A0–E0 correspond to the first display setting registers 24–28 and symbols A1–E1 correspond to the second display setting registers 30–34.

Display setting updating will be detailed below.

When the host CPU 21 receives a request for a setting change from a user or a request for display setting change from an application, it generates display setting data and outputs it to the video signal processing system 46 through a control data and address data line 35.

An address is assigned to each of the first and second display setting registers 24–28 and 30–34 in the video signal processing system 46. The decoder 22 decodes address access from the host CPU 21 and asserts write control signals 37–41 and 102–106 for corresponding first and second display setting registers.

The host CPU 21 inputs a vertical sync signal 45, detects that the vertical sync signal is high, which indicates a non-display period, and starts preparation for making a change to the display setting register. The vertical sync signal enters a display period and goes low.

In the preparation, the CPU 21 analyzes the setting change requested from the user or application and generates setting change data. It is assumed that 0 is set in field 110 and field 111 of the display control register 112 and 0 is held by the flip-flop 90 at this point of time.

The host CPU 21 writes the display setting data to be updated into the second display setting registers 30–34 after the preparation.

Data a1 is written into second display setting register 30 at "A1, a1" at the timing indicated on chart 14.

Then, "B1, b1", "C1, c1", "D1, d1", and "E1, e1" are accessed sequentially and data is written at timings indicated on charts 15–18.

The vertical sync signal 45 again goes high during access to "A1, a1" through "E1, e1". However, the flip-flop 90 does not hold the output from the field 111 of the display control register 112 at the timing of the vertical sync signal because filed 110 of the display control register 112 outputs 0 as shown on chart 20. Therefore, no input to the selector 61–65 is selected.

At "C0, 11", the host CPU 21 completes the display setting changes to the second control register group 29 and therefore requests the video signal processing system 46 to change at once the inputs selected by the selectors 61–65.

At this timing, field 110 of the display control register 112 outputs 1 and field 111 outputs 1 to indicate the selection of the output of the second display setting register. However, because the vertical sync signal 45 is low, which indicates a display period, the flip-flop 90 does not set the output of field 111 and the selectors 61–65 select the output of the first display setting registers as the output to the display output module 44.

Next, when the vertical sync signal changes from low to high, a first control signal generator 49 asserts the write control signal of the flip-flop 90 according to the vertical sync signal 45 and the output of field 110 and holds the output of field 111.

The selectors 61–65 uses the output of the flip-flop 90 as the select signal 90a to select the outputs of the second display setting registers 30–34 at once as an input.

The display output module 44 provides to the monitor 47 digital signal processing settings updated according to the changes made to the outputs of the selectors 60–65, including a selector output 109 of the selector 61.

Next time setting changes become necessary, the host CPU 21 makes write access to the first control register group 23 and makes access "C0, 10" to request a bulk output change of the selectors 61–65. Then, the display setting change becomes effective with the next vertical sync signal.

In this way, the host CPU 21 can reliably change display settings at a once in synchronization with the vertical sync signal 45.

Thus, no display output occurs with a combination of setting values different from the change of display setting required by the user or application.

Preferably, furthermore, both of the first and second display setting registers 24–28 and 30–34 are address-mapped to the host CPU 21, and versatility can be provided to the configuration of the application.

A specific example may be a case where an application is separated into a plurality of routines for function blocks and the plurality of routines use different combinations of display setting registers.

According to the prior art, if switching between routines is performed frequently within the application, display settings should be initialized each time the switching between the routines is performed. According to the second embodiment of the present invention, on the contrary, two types of display settings can be held beforehand and, when switching between routines relating to display is performed, switching between the two types of settings can be accomplished simply by switching the display control register 112.

Thus, the number of bus accesses by the host CPU 21 can be reduced and the fast display switching can be achieved.

(Third Embodiment)

Figure 5:
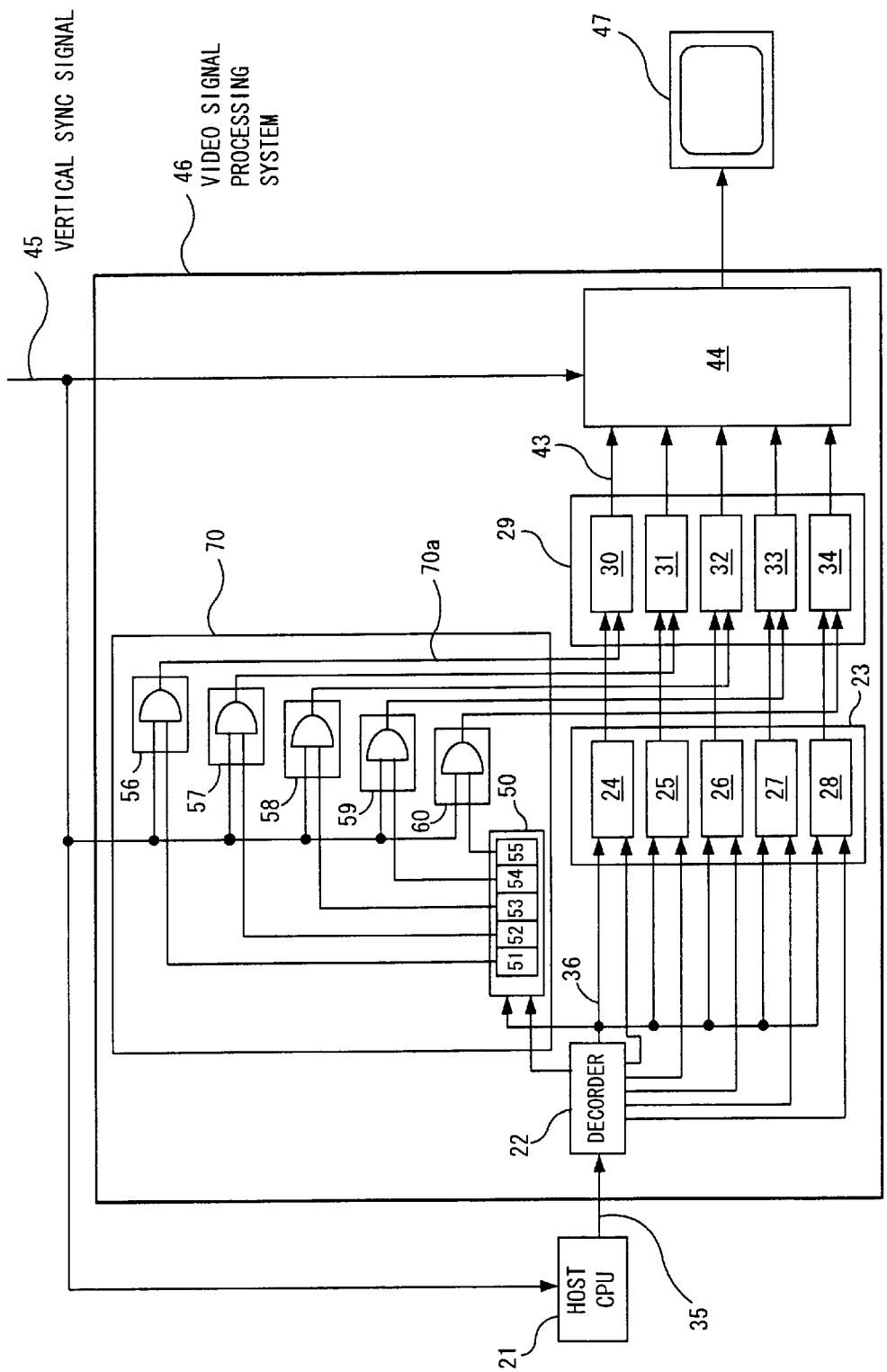
FIG. 5 shows a block diagram of a video signal processing system according to a third embodiment of the present invention.

FIG. 5 shows a third embodiment of the present invention.

Elements that have the same effects as those of the elements of the first embodiment of the present invention are labeled with the same reference numbers.

FIG. 5 shows a video signal processing system according to the third embodiment of the present invention. Differences from the first embodiment of the present invention shown in FIG. 1 are that a display control index register 50 includes fields 51–55 corresponding to second display setting registers 30–34, respectively, a write control signal to the second display setting registers 30–34 is independently outputted through the output 70a of first control signal generators 56–60, instead of the first control signal 49a.

An example is shown in which fields 51–55 of the display control index register 50 are assigned to each address for field by a host CPU 21 and a decoder 22 decodes address access from the host CPU 21 to generate each write signal for field.

The host CPU 21 obtains information in fields 51–55 of the display control index register 50 by performing a read access to them to change only the fields that are desired to be changed, and then performs a write accesses to fields 51–55. A field may be added to the register 50 that indicates the position of a field among fields 51–55 that is desired to be updated, thereby allowing the host CPU 21 to separately update fields 51–55 only by a write access.

This allows display setting registers to be separately updated.

A display setting start flag may be provided in the fields of the display control index register 50 to control display settings by the host CPU 21 by following the same procedure used in the first embodiment of the present embodiment.

(Fourth Embodiment)

Figure 6:
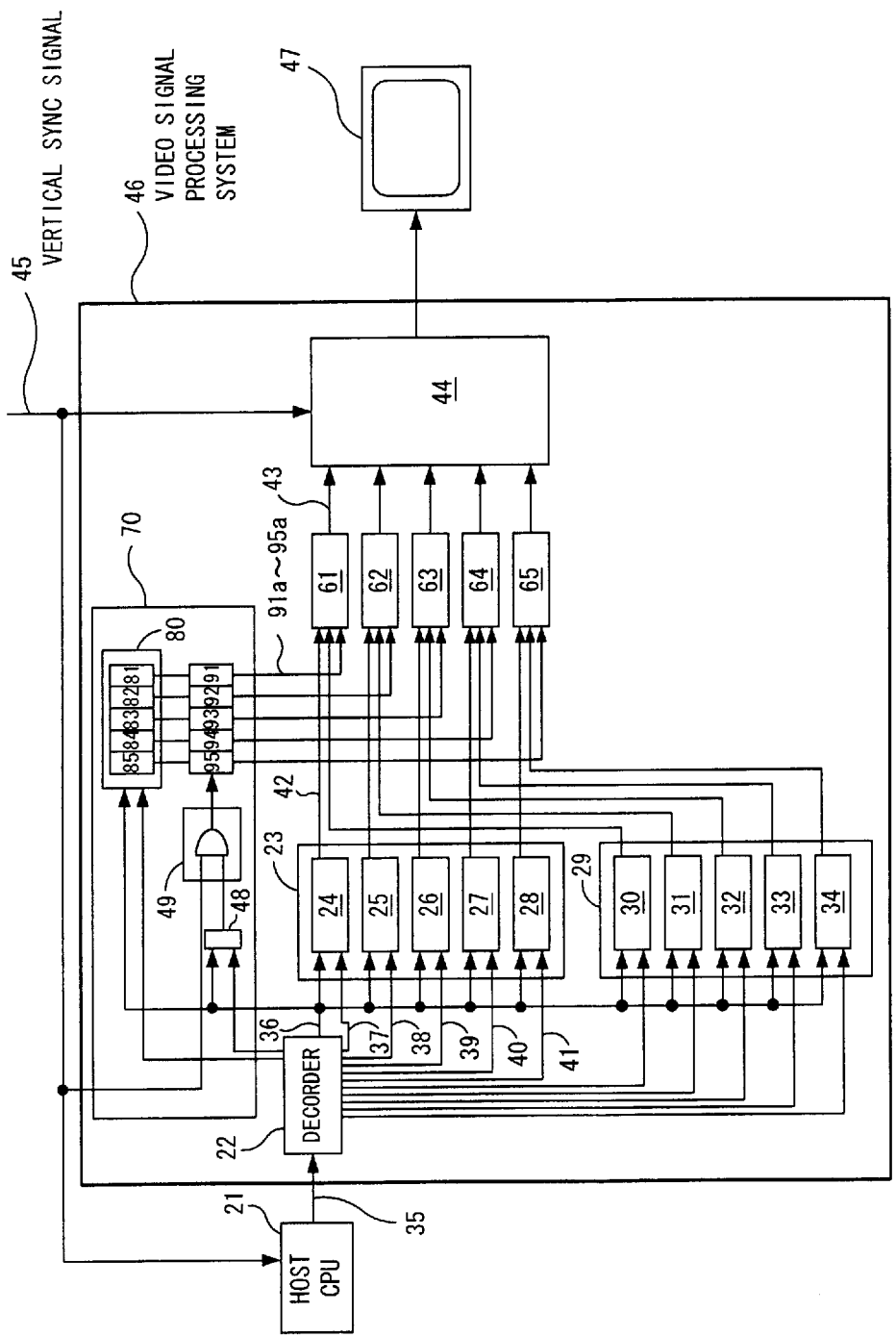
FIG. 6 shows a block diagram of a video signal processing system according to a fourth embodiment of the present invention.

FIG. 6 shows a fourth embodiment of the present invention.

Elements that have the same effects as those of the elements of the second embodiment of the present invention are labeled with the same reference numbers.

FIG. 6 shows a video signal processing system according to the fourth embodiment of the present invention. The fourth embodiment is different from the second embodiment of the present invention shown in FIG. 3 in that a display control index register 80 includes fields 81–85 corresponding to selectors 61–65, respectively, and flip-flops 91–95 and select control signals are provided for the selector 61–65 separately.

In this example, fields 81–85 of the display control index register 80 are assigned to each address by a host CPU 21 and a decoder 22 decodes address access from the host CPU 21 to generate each write signal.

Therefore, the host CPU 21 performs read access to fields 81–85 of the display control index register 80 to obtain information from them and makes a change to only the information in fields that are desired to be changed and performs write access to fields 81–85. A field indicating the position of fields that are desired to be updated may be added to allow the host CPU 21 to separately update those fields among fields 81–85 simply by performing write access.

A display setting start flag register 48 in this embodiment is the same as that in the first embodiment of the present invention. Data in fields 81–85 is inputted into the flip-flops 91–95 on the leading edge of the pulse of an output from a first control signal generator 49. The flip-flops 91–95 generate first control signals 91a–95b corresponding to the selectors 61–65, respectively. The selectors 61–65 select an output from a first display setting registers 24–28 or an output from a second display setting registers 30–34 according to the first control signals 91a–95a.

This allows display setting data output from the selectors 61–65 to be updated separately.

(Fifth Embodiment)

Figure 7:
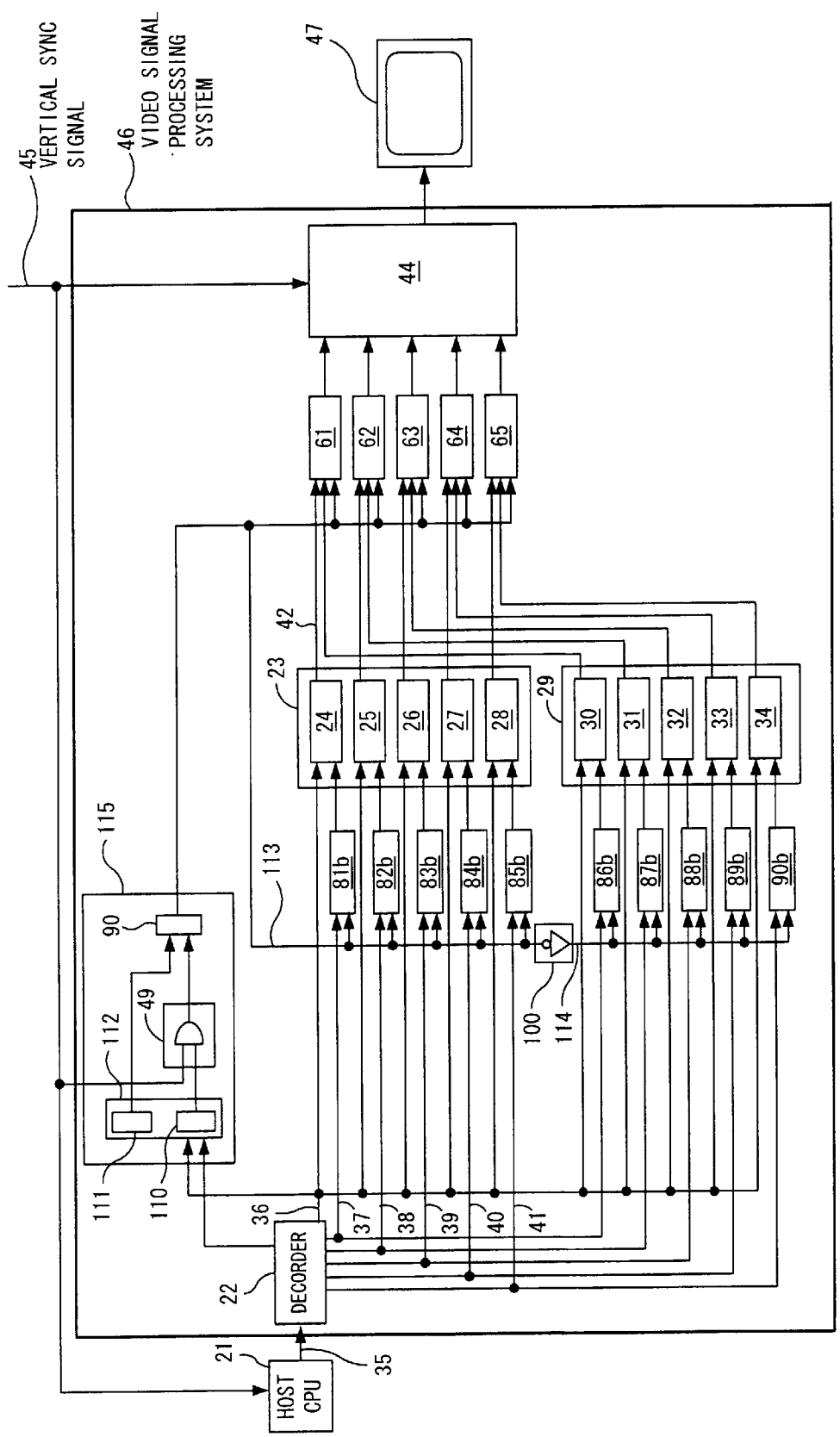
FIG. 7 shows a block diagram of a video signal processing system according to a fifth embodiment of the present invention.

FIG. 7 shows a fifth embodiment of the present invention.

Elements that have the same effects as those of the elements of the second embodiment of the present invention are labeled with the same reference numbers.

FIG. 7 shows a video signal processing system according to the fifth embodiment of the present invention. This embodiment is different from the second embodiment shown in FIG. 3 in that there are provided control circuits 81b–85b which a selector selection signal 113 output from a selector selection signal generator 115 and write control signals 37–41 output from a decoder 22 are inputted into and generate write control signals associated with first display setting registers 24–28, a control circuit 100 formed of an inverter, and control circuits 86b–90b which write control signals 37–41 and a selector selection signal 114, which is the selector selection signal 113 inverted by the control circuit 100, are inputted into and generate write control signals associated with second display setting registers 30–34. An address is assigned to each pair of the first display setting registers 24–28 and the second display setting registers 30–34 by the host CPU 21.

Because of this configuration, output display setting data is outputted to the first display setting registers 24–28 or the second display setting registers 30–34 through the write control signals 37–41 output from the decoder 22.

As described with respect to the second embodiment of the present invention, the selector selection signal generator 115 generates the selector control signal 113 for selecting an output from the first display setting registers 24–28 or an output from the second display setting registers 30–34 to be inputted by the selectors 61–65.

It is assumed as a first state that the host CPU has set "0" in filed 111 and "1" in filed 110 of a display control register 112 and the selector control signal generator 115 has generated a selector control signal 113 so that a first display setting register is selected that contains display setting data to be referenced by a display output module 44 in synchronization with a vertical sync signal 45.

Here, the control circuits 81b–85b into which the selector control signal 113 and write control signals 37–41 are inputted is prohibited to write data into the first display setting registers 24–28 so as not to propagate the write control signal, which is provided from the decoder 22 in response to access from the host CPU, to the first display setting registers 24–28.

On the other hand, the control circuits 86b–90b into which the selector control signal 114 and write control signals 37–85 are inputted are allowed to write data into the second display setting registers 30–34 so as to propagate the write control signal provided from the decoder 22 in response to access from the host CPU to the second display setting registers 30–34.

In a second state in which the host CPU 21 changes display setting data, the display setting registers are sequentially accessed.

Here, the display setting data provided by the host CPU 21 is held in the second display setting registers 30–34.

The host CPU 21 sets "1" in field 111 of the display control register 112 and "1" in field 110 after updating all the display setting data.

Value "1" in field 111 is inputted into and held by a flip-flop 90 when the vertical sync signal 45 is asserted.

Therefore, the selectors 61–65 provide an output from the second display setting registers 30–34 to the display output module 44 and the display output module 44 performs display output data processing based on the updated display setting data.

At the same time, the write control signals 37–41 outputted from the decoder 22 are propagated to the first display setting registers 24–28 through the control circuits 81b–85b and force the first display setting registers 24–28 to be write-enabled. On the other hand, the control circuits 86b–90b are prohibited to write so as not to propagate the write control signals 37–41 to the second display setting registers 30–34.

Then, the above-described state is repeated by the host CPU 21 to update the display setting data.

This configuration allows the display setting data to be updated by following a procedure similar to the one controlled by the host CPU 21 in the first embodiment of the present invention and, in addition, switching between two types of display setting data can be quickly performed.

Specifically, in the first embodiment of the present invention, when display settings in a second processing pattern are changed after display setting data in a first processing pattern provided to the second display setting registers are processed for display, write access to the first display setting registers is performed to write the display setting data indicating the second processing pattern into them, then the second display setting registers are updated. When the display processing is performed in the first processing pattern subsequently, the display setting pattern indicating the first processing pattern must be re-accessed from the host CPU for writing, therefore another system bus cycle is consumed and display switching cannot be quickly performed.

In the fifth embodiment on the other hand, display setting data indicating two types of display processing patterns are always held and switching between them is performed simply by a write to the display setting control register, allowing faster switching.

In the fifth embodiment, if the selectors 61–65 select the registers 24–28 for outputting data, the selectors 81b–85b and 86b–90b use the control signal 113 in such a way that the registers 30–34 can be updated by the host CPU 21. Thus, they can be controlled by a single control signal. However, they can be configured so as to be controlled by two control signals.

Specifically, a video signal processing system is provided between a host CPU 21 and a monitor 47 for updating display setting data by the host CPU. The video signal processing system has a plurality of pairs of first display setting registers 24–28 and second display setting registers 30–34, each of which pairs is assigned to one address. The video signal processing system includes a decoder 22 for generating a plurality of write control signals 37–41 associated with the plurality of pairs for address access, a display control register 112 for temporarily holding display control information generated and outputted from an external source asynchronously with a vertical sync signal, and a plurality of selectors 61–65 for selecting an output from among outputs of the first display setting registers 24–28 and the second display setting registers 30–34 inputted into the selectors and outputting the output to a display output module 44. The first and second display setting registers 24–28 and 30–34 select and hold display setting data, which is generated by the host CPU 21 asynchronously with the vertical sync signal 45, according to a first control signal 113 and the write control signals 37–41. The selectors 61–65 select an output from the first display setting registers 24–28 and an output from the second display setting registers 30–34 to output them to a display output module 44 in synchronization with a second control signal 114. The first and second control signals are generated by using the vertical sync signal 45 and an output from the display control register 112.

(Sixth Embodiment)

Serial display setting access can be ensured and display setting control that does not decrease the system performance can be achieved by providing, in the second, fourth, and fifth embodiments, means for indicating input switching information about the plurality of selectors to an external source.

In particular, a display switching end interrupt signal can be generated based on an output from the first control signal generator 49 shown in FIG. 3 in a manner similar to that in the first embodiment of the present invention.

(Seventh Embodiment)

Figure 8:
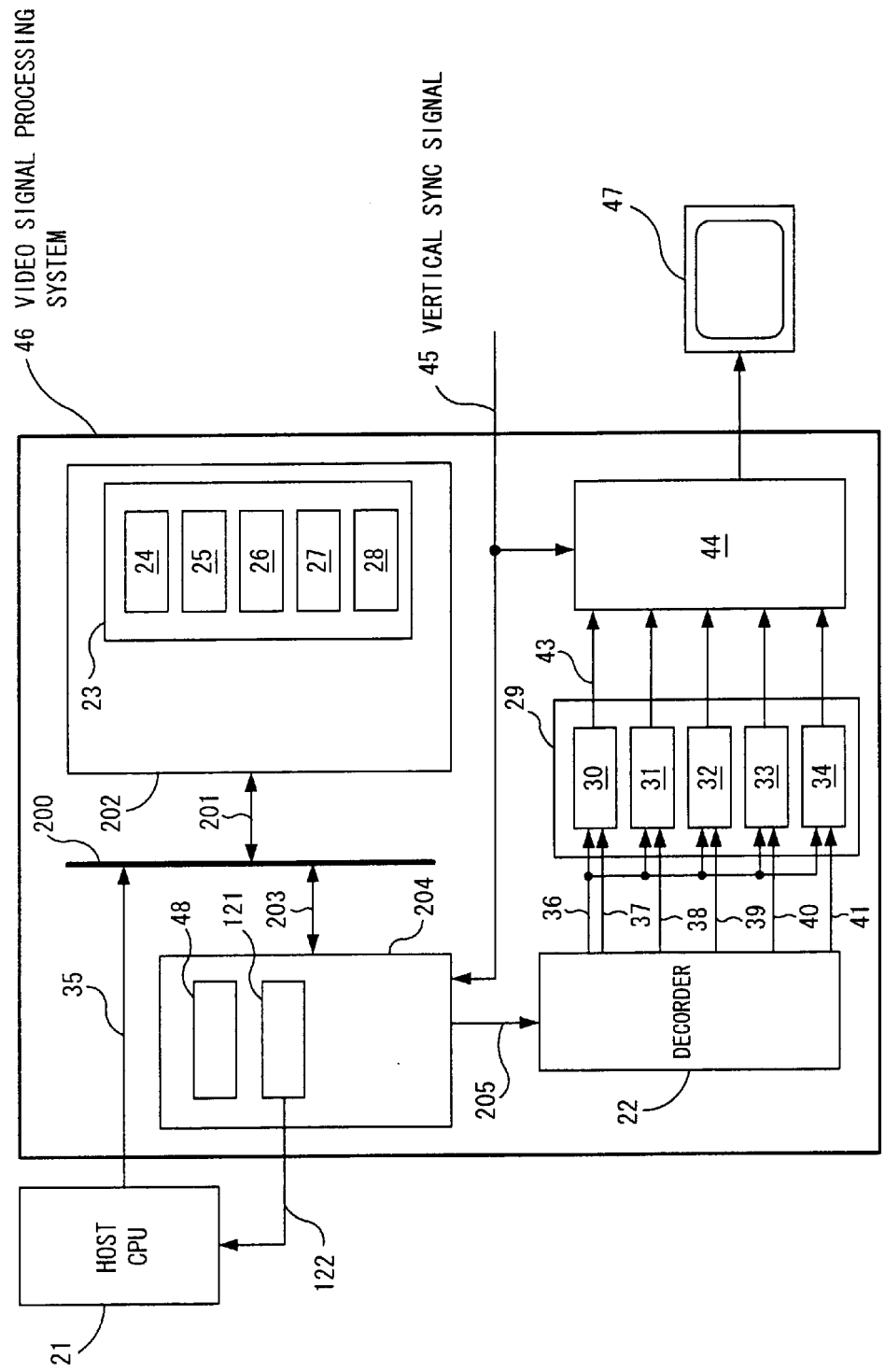
FIG. 8 shows a block diagram of a video signal processing system according to a seventh embodiment of the present invention.
Figure 9:
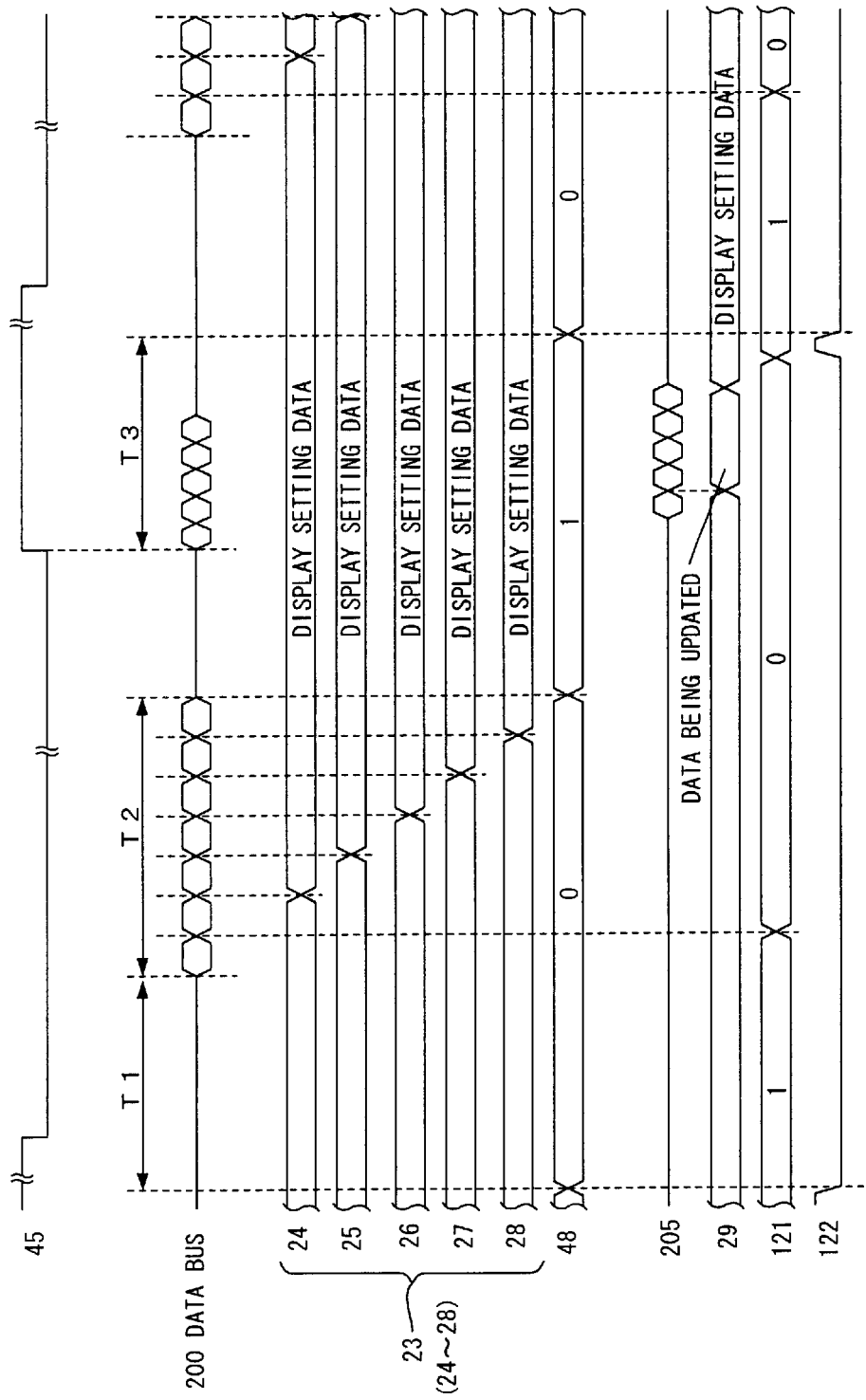
FIG. 9 shows a control timing diagram of a host CPU and the video signal processing system according to the seventh embodiment.

FIGS. 8 and 9 show a seventh embodiment of the present invention.

FIG. 8 shows a video signal processing system according to the present invention.

Reference number 21 indicates a host CPU, 22 indicates a decoder, 23 indicates a first control register group made up of first display setting registers 24–28. Reference number 29 indicates a second control register group made up of second display setting registers 30–34. Reference number 35 indicates a control and address data line, 36 indicates a control data line, reference numbers 37–41 indicate write control signals, reference number 43 indicates a register output, 44 indicates a display output module, 45 indicates a vertical sync signal, 46 indicates a video signal processing system, 47 indicates a monitor, 48 indicates a display setting start flag register in which a display setting start flag is set, 121 indicates a display setting end flag register in which a display setting end flag is set, 122 indicates an interrupt control signal, 200 indicates a data bus, and 202 indicate a register storage module including the first control register group 23. Reference number 204 indicates a register setting controller. FIG. 9 shows a timing diagram for main components shown in FIG. 8.

When the host CPU 21 receives a setting change request from a user or a display setting change request from an application, it generates display setting data and outputs it to the video signal processing system 46 through the control and address data line 35.

The display setting data is inputted as control and address data 201 on the data bus 200 into the register storage module 202 responsible for input and output to and from the first control register group 23.

An address is assigned to each of the first display setting registers 24–28 in the register storage module 202 and address access from the host CPU 21 is written into the corresponding first display setting registers.

The host CPU 21 analyzes setting change information provided from the user or the application to generate setting change data sequentially.

At this point of time, the display setting start flag register 48 has been reset to "0" and no access is made to the display registers even if the vertical sync signal 45 is inputted to the register setting controller 204, therefore values in the second display setting registers 30–34 are not updated.

While the host CPU 21 sequentially accesses the first display setting registers 24–28, the register setting controller 204 does not access the display setting registers and values in the second display setting registers are not updated even though the vertical sync signal 45 is inputted, because the display setting start flag register 48 remains "0".

The host CPU 21 writes "1" into the display setting start flag register 48 to request the video signal processing system 46 to make changes to the second control register group 29 after the completion of the display setting change made to the first control register group 23.

The display setting start flag register 48 is set to "1" at this point of time. However, the register setting controller 204 does not access the display setting registers while the vertical sync signal 45 is low, which indicates a display period, regardless of the value in the display setting start flag register 48.

When the vertical sync signal 45 goes high to indicate a non-display period, the register setting controller 204 makes address access to the first control register group 23 and the second control register group 29 and uses data in the first control register group 23 to update the data in the second control register group 29 because "1" is set in the display setting start flag register 48.

The address access from the register setting controller 204 to the first control register group 23 is performed on the data bus 200.

The register setting controller 204 outputs control data and address data 203 to the register storage module 202 for reading data from the registers.

The register storage module 202 inputs the control data and address data 203 for reading the data from the registers and outputs the data held in the first control register corresponding to the address to the register setting controller 204.

When the data in the first control register is inputted into the register setting controller 204, the register setting controller 204 makes address access to a corresponding control register in the second control register group 29 with the data. The address access from the register setting controller 204 to the second control register group 29 is decoded by the decoder 22 and a write control signal for writing data into a corresponding second display setting register is asserted, thereby updating the register.

The register setting controller 204 uses data in the first control register group 23 to update data in the second control register group 29 sequentially while the vertical sync signal 45 is high, which indicates a non-display period.

If the vertical sync signal 45 goes low, which indicates a display period, while the register setting controller 204 is updating the data in the second control register group 29, the register setting controller 204 suspends the update of the data in the second control register group 29 to withhold from displaying data being updated until the next time the vertical sync signal 45 goes high. Thus, the image quality is not degraded.

After the completion of the update of the second control register group 29, the register setting controller 204 resets the display setting start flag register 48 to "0" and sets the display setting end flag register 121 to "1".

The value in the display setting end flag register 121 is outputted to the host CPU 21 as an interrupt control signal 122.

The display output module 44 provides to the monitor 47 digital signal processing settings updated according to the changes made to the outputs of the second control register group 29, including a register output 43 of the second display setting registers 30–34.

The host CPU 21 detects that the interrupt control signal 122 is asserted and, when the next time a change to setting data becomes necessary, starts write access for updating the display setting data.

Symbol T1 in FIG. 9 indicates display setting data access wait time, T2 indicates a display setting data write period, and T3 indicates operation time of the register setting controller.

As described above, the control by the register setting controller 204 is applied to a control circuit in a configuration of the video signal processing system 46 including general memory accessible to the video signal processing system 46 and the control circuit having the capability of accessing the general memory and the display setting registers, thereby allowing the display setting registers to be accessed without regard to vertical sync periods.

(Eighth Embodiment)

Figure 10:
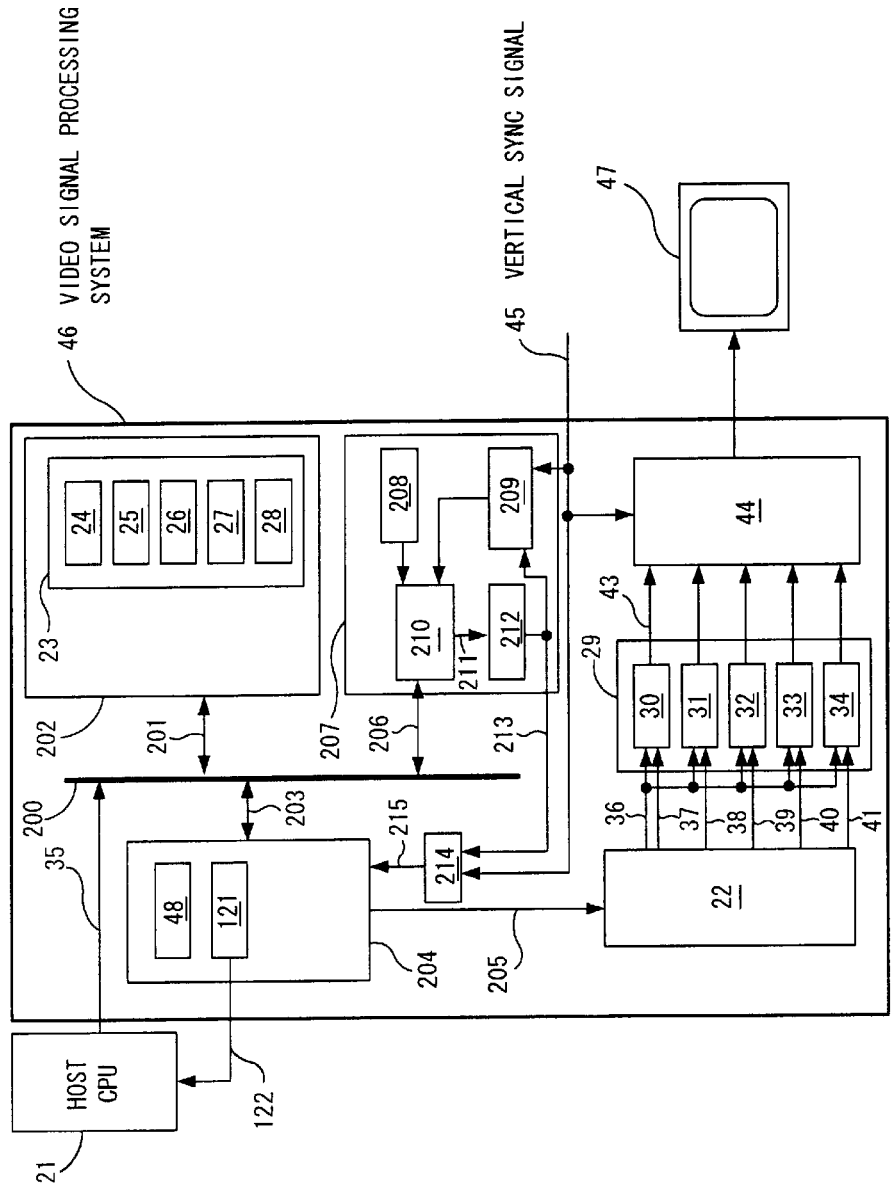
FIG. 10 shows a block diagram of a video signal processing system according to an eighth embodiment according to the present invention.
Figure 11:
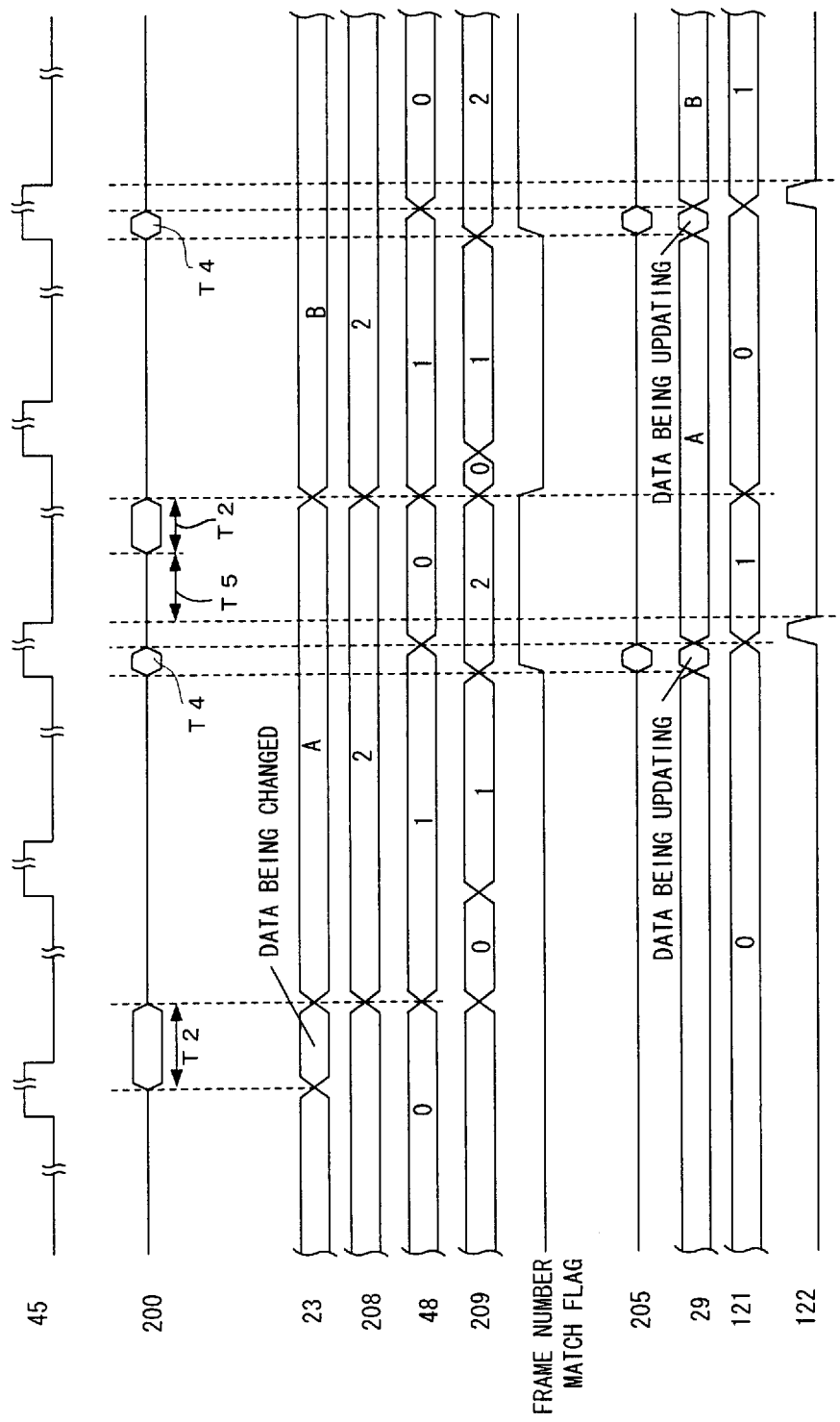
FIG. 11 shows a control timing diagram of a host CPU and the video signal processing system according to the eighth embodiment.

FIGS. 10 and 11 show an eighth embodiment of the present invention.

FIG. 10 shows a video signal processing system according to the present invention, which has the same configuration as that of the seventh embodiment of the present invention shown in FIG. 8, except that a frame count detector 207 and a vertical sync signal control circuit 214 are added. The frame count detector 207 consists of a frame count setting register 208, a frame counter 209, a comparator 210, and frame count match flag 212.

FIG. 11 shows a timing diagram of main components shown in FIG. 10.

When a host CPU 21 receives a request for a setting change from a user or a display setting change from an application, it generates display setting data and outputs it to a video signal processing system 46 over a control data and address data line 35.

In the video signal processing system 46, the display setting data is inputted as control and address data 201 on a data bus 200 into a register storage module 202 responsible for input to and output from a first control register group.

An address is assigned to each of the first display setting registers 24–28 in the register storage module 202 and address access from the host CPU 21 is written into the corresponding first display setting registers.

The host CPU 21 analyzes setting change information provided from the user or the application and generates setting change data sequentially.

At this point of time, a display setting start flag register 48 has been reset to "0" and no access is made to the display setting registers even if the vertical sync signal 45 is inputted to a register setting controller 204, therefore values in second display setting registers are not updated.

While the host CPU 21 sequentially accesses the first display setting registers 24–28, the register setting controller 204 does not access the display setting registers and values in the second display setting registers are not updated even though the vertical sync signal 45 is inputted because the display setting start flag register 48 remains "0".

The host CPU 21 changes display settings in the first control register group 23 and at the same time sets a frame count in the frame count setting register 208 of the frame count detector 207 that indicates how many frames should be transmitted before the second control register group 20 is updated.

The set frame count is input as control and address data 206 on the data bus 200 into the frame count detector 207, which performs input and output data to and from the frame count setting register 208.

An address is assigned to the frame count setting register 208 in the frame count detector 207. Write to the register is performed in response to address access from the host CPU 21.

After the display settings in the first control register group 23 are change and a frame count is set in the frame count setting register 208, the host CPU 21 writes "1" into the display setting start flag register 48 to request the video signal processing system 46 to make changes to the second control register group 29.

When the display setting start flag register 48 becomes "1", the register setting controller 204 resets the frame counter 209 of the frame count detector 207 to "0".

The frame counter 209 counts frames by incrementing its value by one each time the vertical sync signal 45 changes from low to high.

Outputs from the frame count setting register 208 and frame counter 209 are inputted into the comparator 210.

The comparator 210 outputs a match signal 211 to the frame count match flag 212 if the value in the frame count setting register 208 matches the value in the flame counter 209.

The match signal 211 outputted from the comparator 210 is "1" if the value in the frame count setting register 208 matches the value in the frame counter 209 or "0" if the values do not match.

The frame count match flag 212 holds the value of the match signal 211 and an output 213 from the frame count match flag is inputted into the vertical sync signal control circuit 214 and the frame counter 209.

The vertical sync signal control circuit 214 outputs a low-level signal as a vertical sync signal control circuit output 215 if the output 213 from the frame count match flag is "0" whether the vertical sync signal 45 is low or high. If the output 213 of the frame count match flag is "1", it outputs as the output 215 the vertical sync signal 45 as is.

The output 213 of the frame count match flag is inputted into the frame counter 209. If the output 213 of the frame count match flag is "1", the frame counter 209 stops counting frames and holds the counter value regardless of the transition of the vertical sync signal 45 from low to high.

Because the counter value is held until the frame counter 209 is reset to 0 if the value in the frame counter 209 matches the value in the frame count setting register 208, the frame count detector 207 can maintain the output 215 of the vertical sync signal control circuit, which is input to the register setting controller 204, at the low level until the frame counter 209 matches the frame count setting register 208 after the frame counter 209 is rest to "0".

When the frame counter 209 matches the frame count setting register 208 and the output 215 from the vertical sync signal control circuit goes high to indicate a non-display period, the register setting controller 204 performs address access to the first control register group 23 and the second control register group 29 to use data in the first control register 23 to update the data in the second control register 29 because the display setting start flag register 48 becomes "1".

The register setting controller 204 uses the data in the first control register group 23 to update the data in the second control register group 29 sequentially while the output 215 from the vertical sync signal control circuit is high, which indicates a non-display period.

However, if the output 215 of the vertical sync signal control circuit goes low, which indicates a display period, while the register setting controller 204 is updating the data in the second control register group 29, the register setting controller 204 suspends the update of the data in the second control register group 29 to withhold from displaying data being updated until the next time the output 215 of the vertical sync signal control circuit goes high. Thus, the image quality is not degraded.

After the completion of the update of the second control register group 29, the register setting controller 204 resets the display setting start flag register 48 to "0" and sets the display setting end flag register 121 to "1".

The value in the display setting end flag register 121 is outputted to the host CPU 21 as an interrupt control signal 122.

The display output module 44 provides to the monitor 47 digital signal processing settings updated according to the changes made to the outputs of the second control register group 29, including a register output 43 of the second display setting registers.

The host CPU 21 detects that the interrupt control signal 122 is asserted and, when the next time a change to setting data becomes necessary, starts write access for updating the display setting data.

Symbol T2 in FIG. 11 indicates a display setting data write period, T4 indicates a display setting data read period, and T5 indicates a display setting data read period.

This configuration allows the display setting register to be accessed without regard to vertical sync periods and, in addition, allows write access to the first display setting registers and the display setting start flag register 48 for changing display settings to be completed several frames before a time point at which the display settings are desired to be changed.

(Ninth Embodiment)

Figure 12:
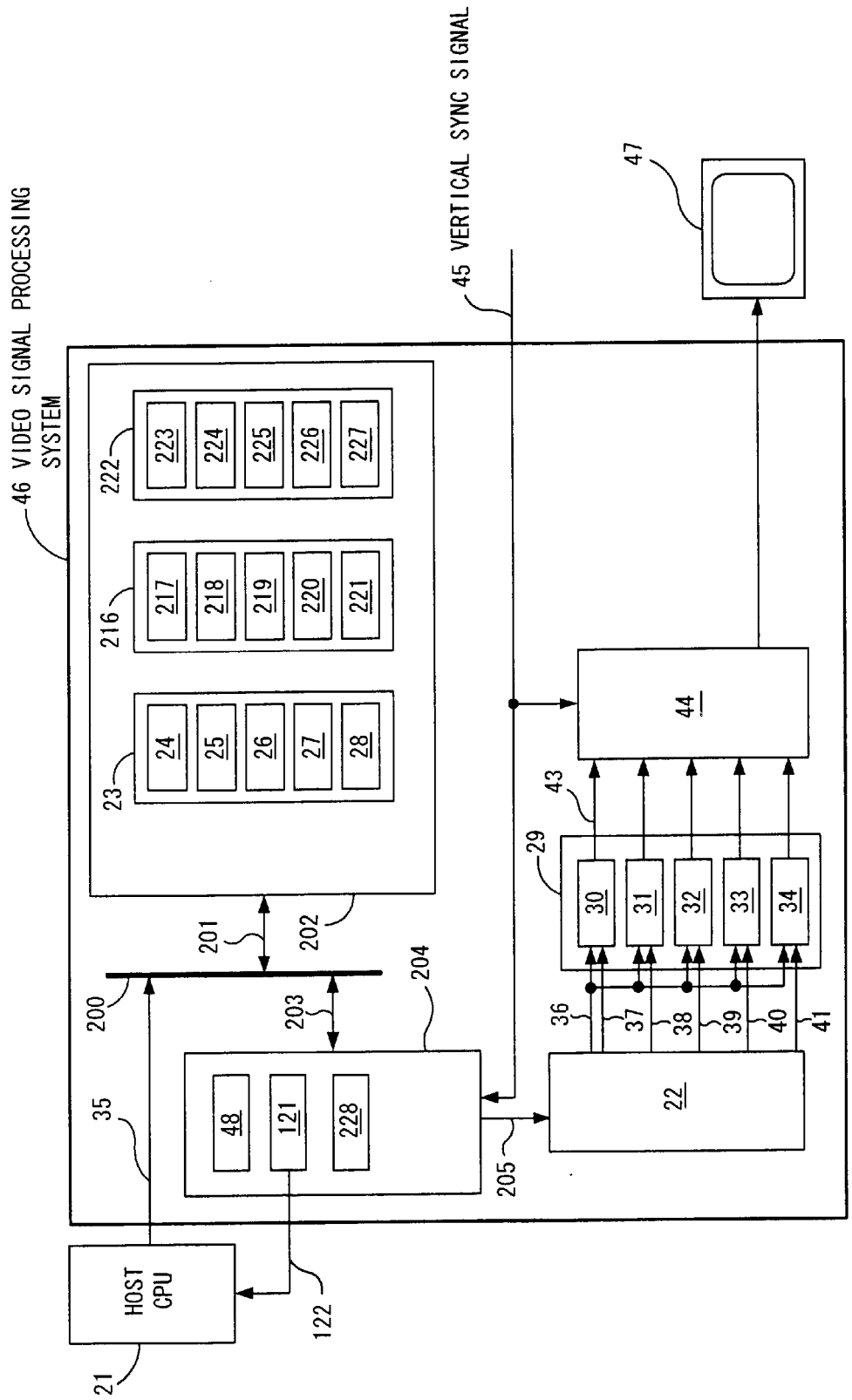
FIG. 12 shows a block diagram of a video signal processing system according to a ninth embodiment of the present embodiment.

FIG. 12 shows a ninth embodiment of the present invention.

In FIG. 12, a third control register group 216 and a fourth control register group 222 are added to the register storage module 202 shown in FIG. 8 and a display setting selection register 228 is also provided.

The third control register group 216 consists of first display setting registers 217–221. The fourth control register group 222 consists of first display setting registers 223–227.

The display setting of the video signal processing system is updated as follows.

When a host CPU 21 receives a request for setting change from a user or a request for display setting change from an application, it generates display setting data and outputs it to the video signal processing system 46 over a control and address data line 35.

In the video signal processing system 46, the display setting data is inputted as control and address data 201 on a data bus 200 into a register storage module 202 responsible for input and output data to and from a first control register group 23.

An address is assigned to each of the first display setting registers 24–28, 217–221, and 223–227 in the register storage module 202 and address access from the host CPU 21 is written into the corresponding one of the first display setting registers.

The host CPU 21 analyzes setting change information provided from the user or the application and generates setting change data sequentially.

At this point of time, a display setting start flag register 48 is reset to "0" and no access is made to the display setting registers even if the vertical sync signal 45 is inputted to a register setting controller 204, therefore values in second display setting registers 30–34 are not updated.

The host CPU 21 accesses the first display setting registers 24–28, 217–221, and 223–227 sequentially. However, if none of the first register group 23, third control register group 216, and fourth control register group 222 has data to be set, the display setting start flag register 48 remains "0". Therefore, the register setting controller 204 does not access the display setting registers and data in the second display setting registers 30–34 is not changed even though a vertical sync signal 45 is inputted.

The host CPU 21 changes a display setting register to the register storage module 202 and sets in the display setting selection register 228 a number indicating control register group in the register storage module 202 is used to update the second control register group 29.

After the display setting register is changed to the register storage module 202 and the number is set in the display setting selection register 228, the host CPU 21 writes "1" into the display setting start flag register 48 to request for making the change to the second control register group from the video signal processing system 46.

When the vertical sync signal 45 goes high, which indicate a non-display period, the register setting controller 204 selects a control register group from which data is to be read from among the first control register group 23, third control register group 216, and fourth control register group 222 according to the value set in the display setting selection register 228 because the display setting start flag register 48 is set to "1".

The register setting controller 204 performs address access to the control register group selected according to the value set in the display setting selection register 228 and the second control register 29 to use data in the control register group selected according to the value set in the display setting selection register 228 to update data in the second control register group 29.

The register setting controller 204 uses the data in the control register group selected according to the value set in the display setting selection register 228 to sequentially update the data in the second control register group 29 while the vertical sync signal 45 is high, which indicates a non-display period.

However, if the vertical sync signal 45 goes low, which indicates a display period, while the register setting controller 204 is updating the data in the second control register group 29, the register setting controller 204 suspends the update of the data in the second control register group 29 to withhold from displaying data being updated until the next time the vertical sync signal 45 goes high. Thus, the image quality is not degraded.

After the completion of the update of the second control register group 29, the register setting controller 204 resets the display setting start flag register 48 to "0" and sets the display setting end flag register 121 to "1".

The value in the display setting end flag register 121 is outputted to the host CPU 21 as an interrupt control signal 122.

The display output module 44 provides to the monitor 47 digital signal processing settings updated according to the changes made to the outputs of the second control register group 29, including a register output 43 of the second display setting registers.

The host CPU 21 detects that the interrupt control signal 122 is asserted and, when the next time a change to setting data becomes necessary, starts write access for updating the display setting data.

According to this configuration, the display setting registers can be accessed without regard to vertical sync signal periods and, when a plurality of display settings are to be changed, display setting registers to be used to change the plurality of display settings are written into the register storage module 202 in advance so that the display setting change can be controlled simply by accessing the display setting selection register 228 and the display setting start flag register 48, thereby reducing the number of data writes by the host CPU 21.

While the embodiment has been described in which the three control register groups accessible to the host CPU 21 are used, the display setting control can also be applied to a configuration in which the number of control registers used is any whole number greater than one.

(Tenth Embodiment)

Figure 13:
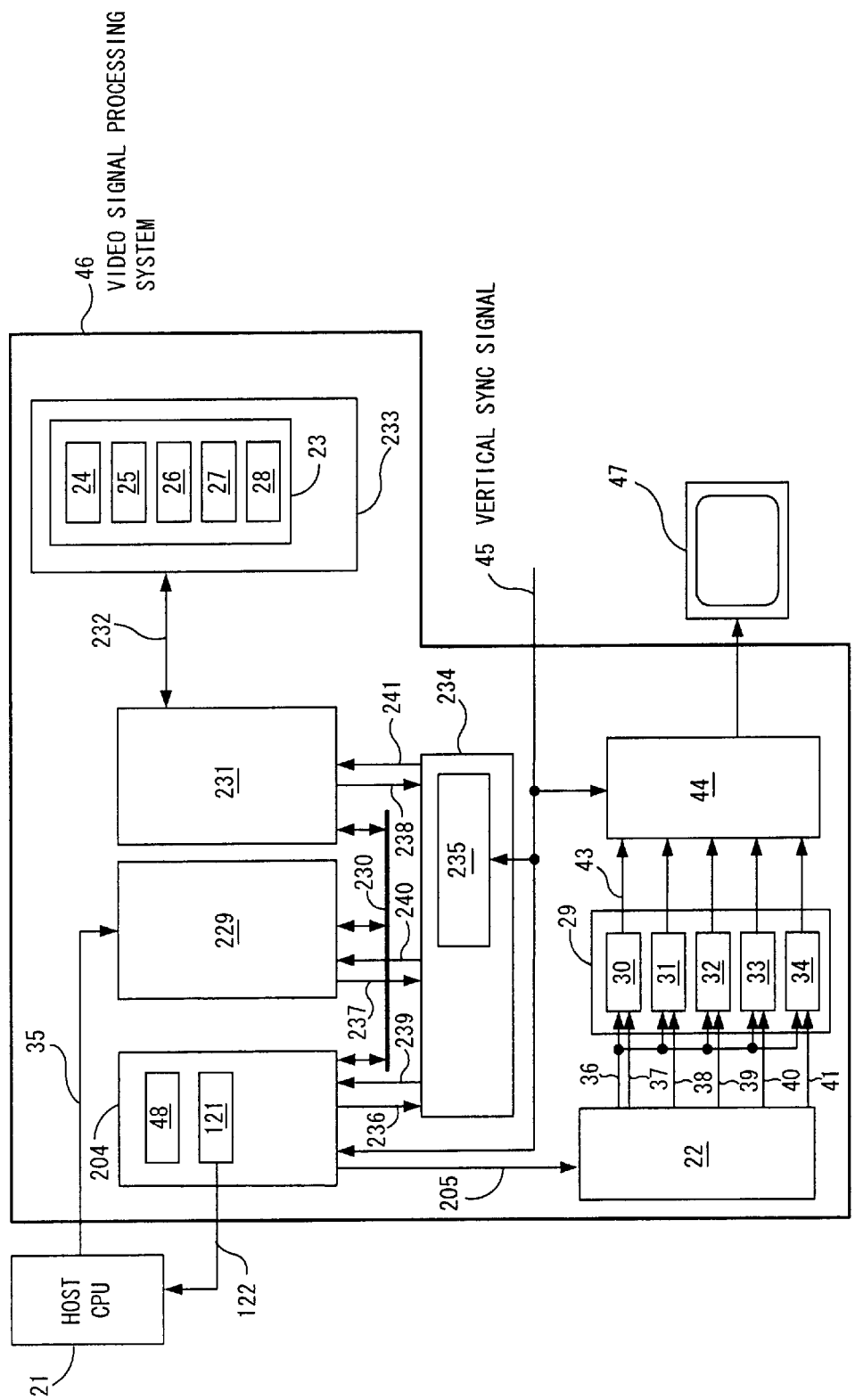
FIG. 13 shows a block diagram of a video signal processing system according to a tenth embodiment of the present invention.
Figure 14:
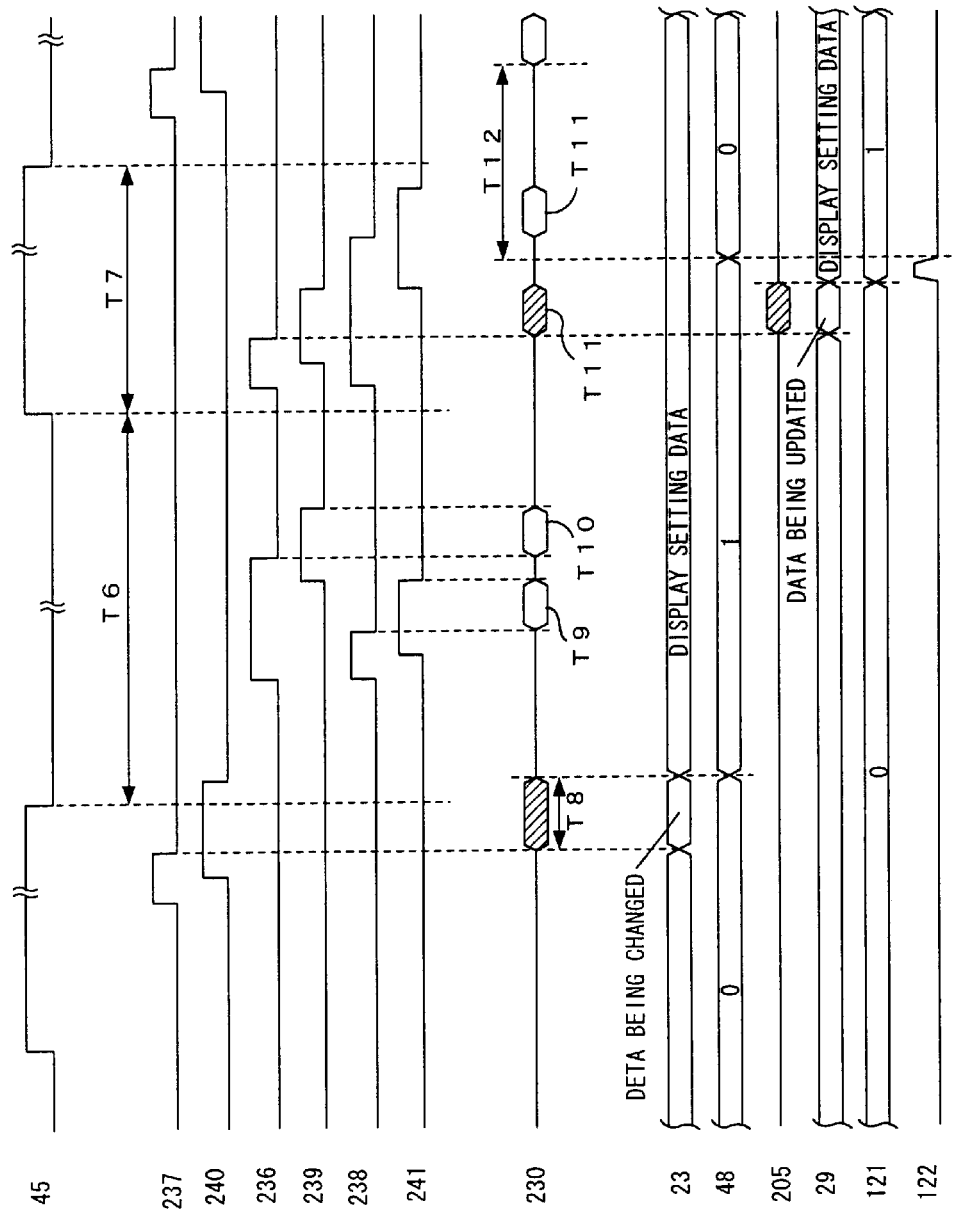
FIG. 14 shows a control timing diagram of a host CPU and the video signal processing system according to the tenth embodiment.

FIGS. 13 and 14 show a tenth embodiment of the present invention.

FIG. 13 shows a video signal processing system according to the tenth embodiment of the present invention. A CPU interface 229, a data bus 230, a synchronous DRAM (hereinafter called SDRAM) interface 231, an SDRAM bus 232, an SDRAM 233, a data bus arbiter 234, a priority change circuit 235, data bus use request signals 236–238, and data bus use grant signals 239–241 are added to the configuration shown in FIG. 8. FIG. 14 shows a timing diagram of main components in FIG. 13.

When a host CPU 21 receives a request for setting change from a user or a request for display setting change from an application, it generates display setting data and outputs it to the video signal processing system 46 through a control and address data line 35.

In the video signal processing system 46, the display setting data is inputted into the CPU interface 229 for controlling inputs and outputs between the host CPU 21 and the video signal processing system 46.

The CPU interface 229 converts the display setting data into a control data and address data used within the video signal processing system 46 and outputs them to the SDRAM interface 231 through the data bus 230.

Before the CPU interface 229 uses the data bus 230, an operation for obtaining the bus is performed as follows.

Because three blocks, a register setting controller 204, the CPU interface 229, and SDRAM interface 231, can provide control data onto the data bus 230 to access the SDRAM, the data bus arbiter 234 is connected with the register setting controller 204, CPU interface 229, and SDRAM interface 231 in order to determine which block provides control data onto the data bus 230.

Before performing address access on the data bus, the register setting controller 204, CPU interface 229, and SDRAM interface 231 provide a data bus use request signal 236–238 to the data bus arbiter 234, and after receiving a data bus use grant signal 239–241 from the data bus arbiter 234, perform the address access using the data bus.

The CPU interface 229 provides its bus use request signal 237 to the data bus arbiter 234.

The data bus arbiter 234 receives the bus use request signal 237 from the CPU interface 229 and, when it determines based on register controller's bus use request signal 236, SDRAM interface's bus use request signal 238, and predetermined priorities that no block having a higher priority than the CPU interface is to use the bus, it provides a bus use grant signal 240 for the CPU interface to the CPU interface 229.

When the bus use grant signal 240 is inputted into the CPU interface 229, the CPU interface 229 uses the data bus 230 to access the SDRAM interface 231 and writes the display setting data into first display setting registers 24–28 on the SDRAM 233.

The host CPU 21 analyzes setting change information provided from the user or the application and generates setting change data sequentially through the CPU interface 229.

At this point of time, a display setting start flag register 48 is reset to "0" and no access is made to the display setting registers even if the vertical sync signal 45 is inputted to a register setting controller 204, therefore values in second display setting registers 30–34 are not updated.

The host CPU 21 accesses the first display setting registers 24–28 sequentially. However, because a display setting start flag register 48 remains "0", the register setting controller 204 does not access the display setting registers and data in the second display setting registers 30–34 is not changed even though a vertical sync signal 45 is inputted.

After the change to the first control register group 23 is completed, the host CPU 21 writes "1" in the display setting start flag register 48 to request the change to the second control register group 29 from the video signal processing system 46.

When a vertical sync signal 45 goes high to indicate a non-display period, the display setting start flag register 48 becomes "1". Thus, the register setting controller 204 performs address access to the first control register group 23 and the second control register group 29 to use data in the first control register group 23 to change data in the second control register group 29.

Before using the data bus 230, the register setting controller 204 performs an operation for obtaining the bus as follows.

The register setting controller 204 provides a bus use request signal 236 to the data bus arbiter 234.

The data bus arbiter 234 receives the bus use request signal 236 from the register setting controller 204 and, when it determines based on CPU interface's bus use request signal 237, SDRAM interface's bus use request signal 238, and predetermined priorities that no block having a higher priority than the register setting controller is to use the bus, it provides a bus use grant signal 239 for the register setting controller to the register setting controller 204.

The data bus arbiter 234 inputs a vertical sync signal 45. If the vertical sync signal 45 is high to indicate a non-display period, the data bus arbiter 234 changes the predetermined priority of the register setting controller 204 to the highest through the priority change circuit 235.

Because the register setting controller 204 accesses the first control register group 23 when the vertical sync signal 45 is high to indicate a non-display period, the access to the first control register 23 always obtains the bus on a top-priority basis without waiting for a bus use grant.

The register setting controller 204 uses data in the first control register group 23 to update data in the second control register group 29 sequentially while the vertical sync signal 45 is high, which indicates the non-display period.

After the completion of the update of the second control register group 29, the register setting controller 204 resets the display setting start flag register 48 to "0" and sets the display setting end flag register 121 to "1".

The value in the display setting end flag register 121 is outputted to the host CPU 21 as an interrupt control signal 122.

The display output module 44 provides to the monitor 47 digital signal processing settings updated according to the changes made to the outputs of the second control register group 29, including a register output 43 of the second display setting registers.

The host CPU 21 detects that the interrupt control signal 122 is asserted and, when the next time a change to setting data becomes necessary, starts write access for updating the display setting data.

Symbol T6 in FIG. 14 indicates a regular bus priority period, T7 indicates the bus priority period for the register setting controller, T8 indicates a display setting data write period, T9 indicates an SDRAM interface's access period, T10 indicates a register setting controller's regular access period, T11 indicates a display setting data read period, and T12 indicates display setting data access wait time.

According to this configuration, the display setting register can be accessed without regard to vertical sync period and, in addition, the update from the first control register group 23 to the second control register group 29 can be efficiently performed during a non-display period even in a case where access to memory including the first control register group 23 may otherwise be obtained by a block other than the register setting controller 204.

It is not necessarily the host CPU that updates display settings externally. Any means that generates display setting data can update the display settings.

While the configuration has been described in which the completion of the display setting is indicated to the host CPU 21 by the interrupt signal, the display setting may be controlled by the host CPU 21 polling the display setting end flag in the display setting end flag register 121.

While the configuration in which the number of blocks connected to the data bus 230 is three, the number of blocks may be any natural number.

(Eleventh Embodiment)

Figure 15:
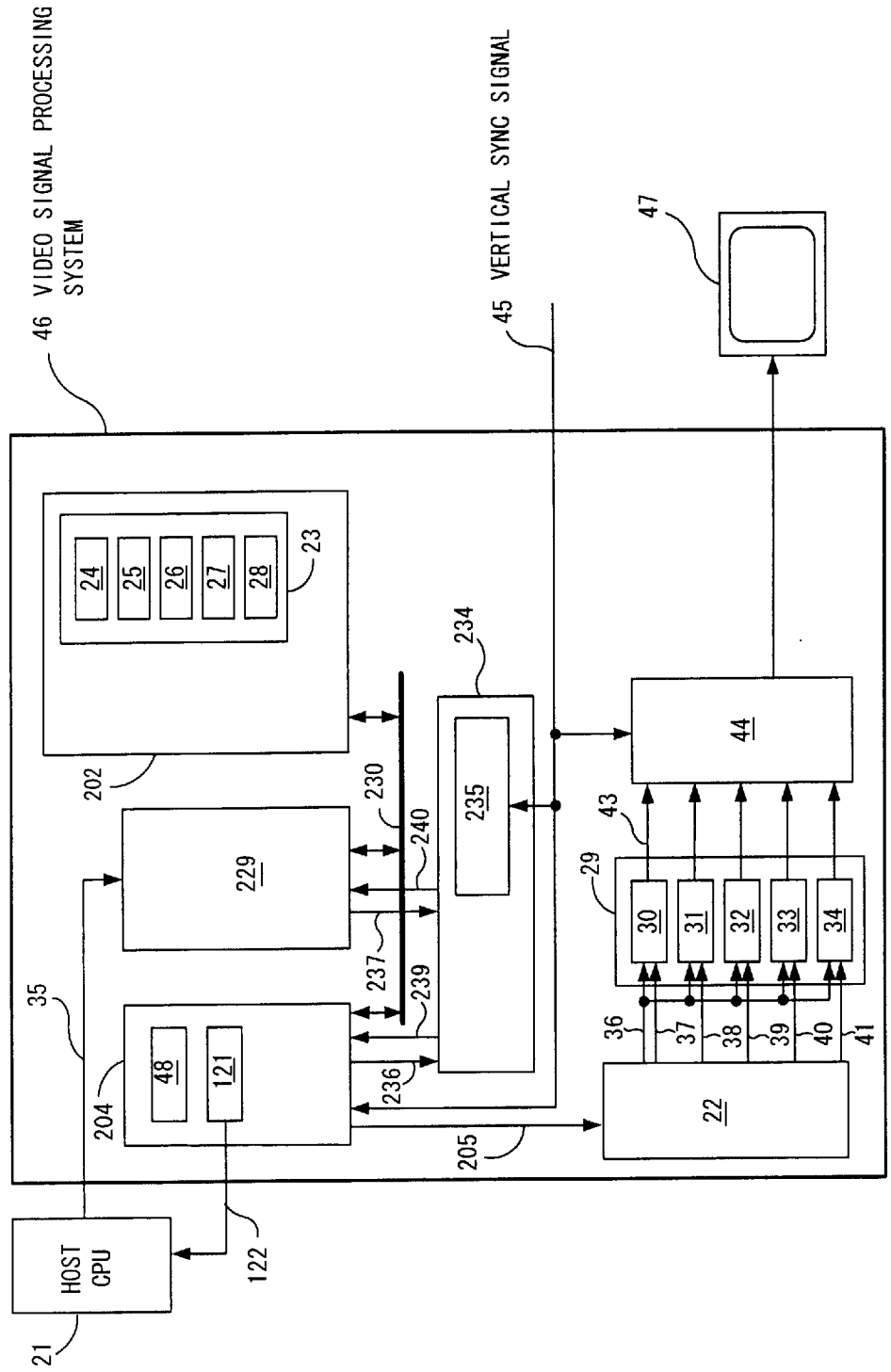
FIG. 15 shows a block diagram of a video signal processing system according to an eleventh embodiment of the present invention.

FIG. 15 shows a configuration shown in FIG. 8 to which a bus arbiter is added to provide a similar effect.

In FIG. 15, a CPU interface 229 and a data bus arbiter 234 are added to a video signal processing system 46 shown in FIG. 8 and a register setting controller 204, the CPU interface 229, and a register storage module 202 are connected by a data bus 230.

In the video signal processing system 46 in FIG. 15, a control and address data line 35 over which display setting data is provided is connected to the CPU interface 229 and the register setting controller 204, CPU interface 229, and register storage module 202 are connected by the data bus 230 to write and read the display setting data from the register setting controller 204 and CPU interface 229 to the register storage module 202.

The data bus arbiter 234 determines which of the register setting controller 204 and the CPU interface 229 is to access a register.

(Twelfth Embodiment)

Figure 16:
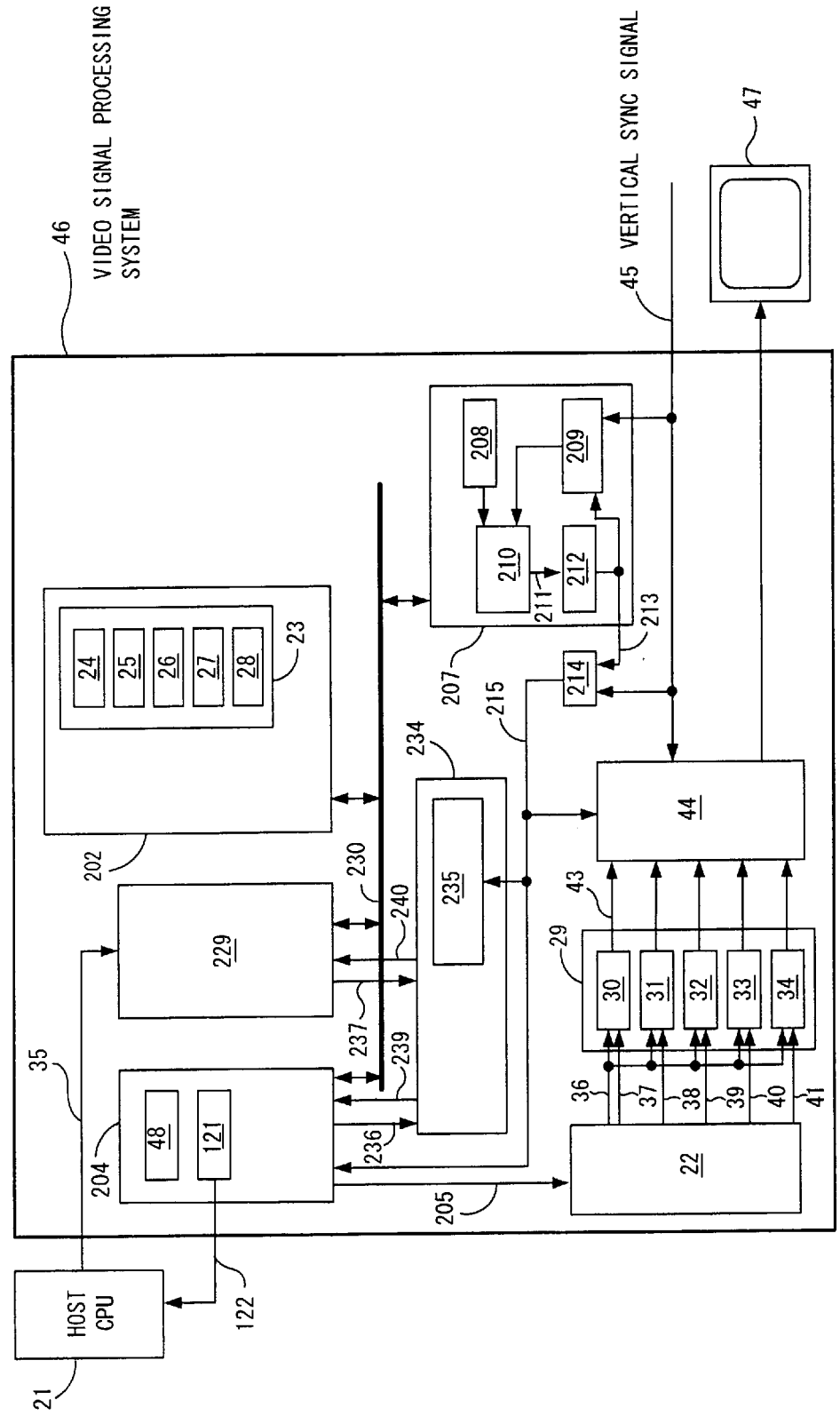
FIG. 16 shows a block diagram of a video signal processing system according to a twelfth embodiment of the present invention.

FIG. 16 shows a configuration shown in FIG. 10 to which a bus arbiter is added to provide a similar effect.

In FIG. 16, a CPU interface 229 and a data bus arbiter 234 are added to a video signal processing system 46 shown in FIG. 10 and a register setting controller 204, the CPU interface 229, a register storage module 202 and a frame count detector 207 are connected by a data bus 230.

In the video signal processing system 46 in FIG. 16, a control data and address data line 35 over which display setting data is provided is connected to the CPU interface 229 and the register setting controller 204, CPU interface 229, register storage module 202 and frame count detector 207 are connected by the data bus 230 to read and write the display setting data from the register setting controller 204 and CPU interface 229 to the register storage module 202 and the frame count detector 207.

The data bus arbiter 234 determines which of the register setting controller 204 and the CPU interface 229 is to access a register.

(Thirteenth Embodiment)

Figure 17:
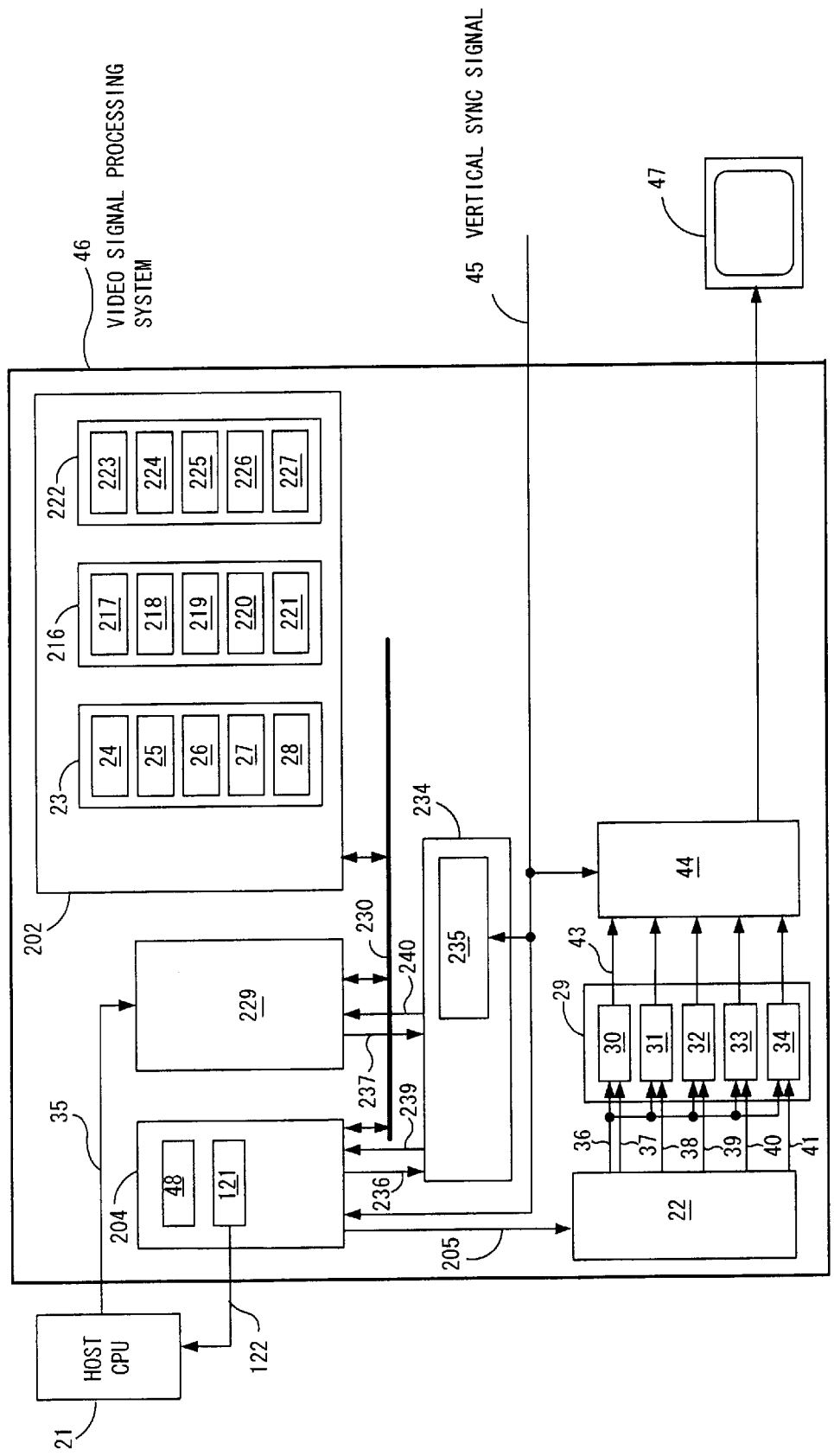
FIG. 17 shows a block diagram of a video signal processing system according to a thirteenth embodiment of the present invention.
Figure 18:
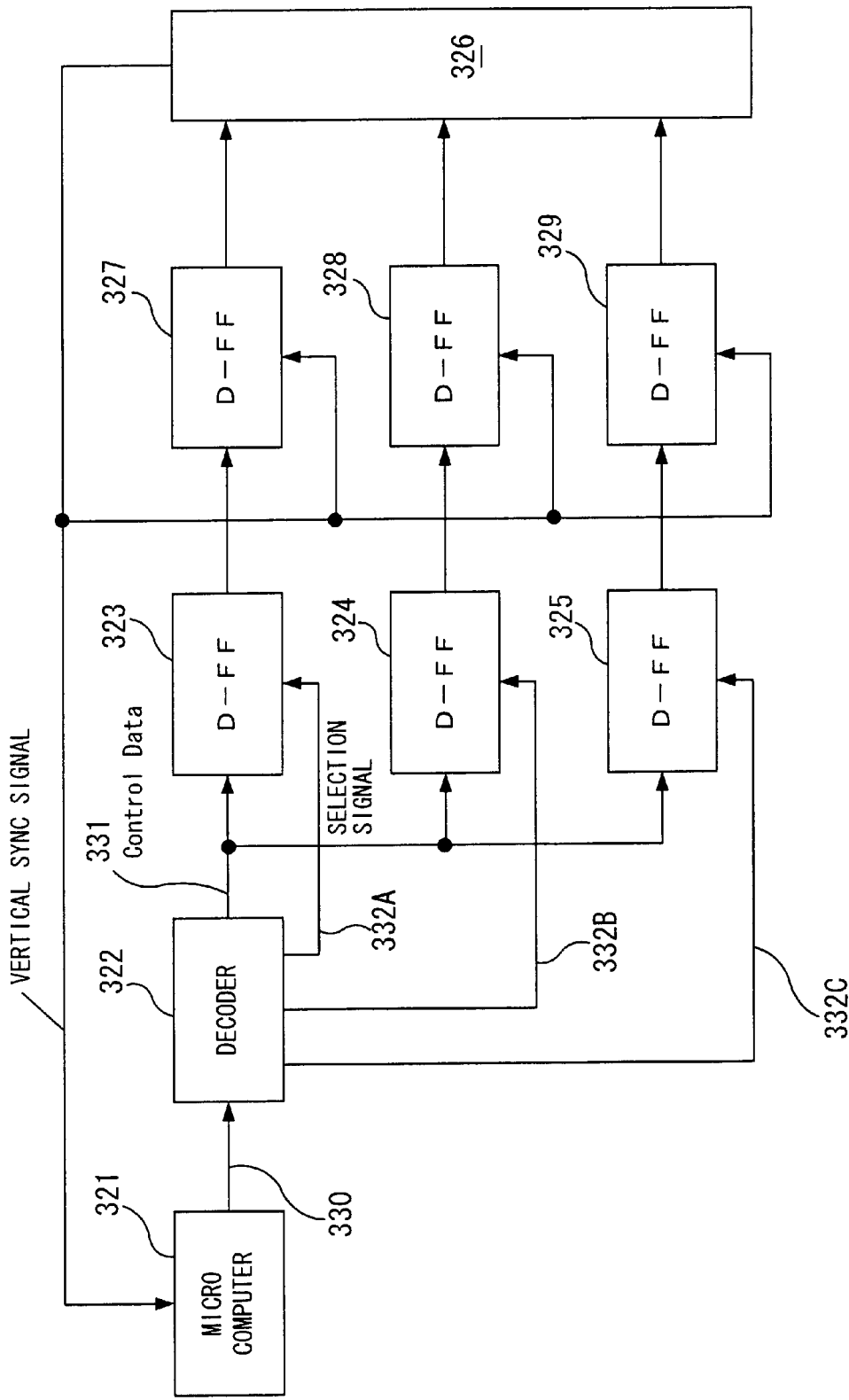
FIG. 18 shows a block diagram of a video signal processing system according to a prior art.

FIG. 17 shows a configuration shown in FIG. 12 to which a bus arbiter is added to provide a similar effect.

In FIG. 17, a CPU interface 229 and a data bus arbiter 234 are added to a video signal processing system 46 shown in FIG. 12 and a register setting controller 204, the CPU interface 229, and a register storage module 202 are connected by a data bus 230.

In the video signal processing system 46 in FIG. 17, a control data and address data line 35 over which display setting data is provided is connected to the CPU interface 229 and the register setting controller 204, CPU interface 229, and register storage module 202 are connected by the data bus 230 to read and write the display setting data from the register setting controller 204 and CPU interface 229 to the register storage module 202.

The data bus arbiter 234 determines which of the register setting controller 204 and the CPU interface 229 is to access a register.

As described above, the video signal processing system according to claim 1 of the present invention which switches between display settings by write access from a host CPU to a plurality of display setting registers allows display setting from the host CPU to be performed asynchronously with a vertical sync signal in a case where an application in the host CPU is running under an OS and the amount of time required for the register access for updating the display settings cannot be defined or the display setting registers in the video signal processing system are buffered in such a way that updates are not reflected in them immediately after the access from the host CPU. The video signal processing system ensures that a plurality of display setting registers are updated at once with a vertical sync signal as long as the sequence of access to the display setting registers from the host CPU for updating the display setting registers followed by a write to a display setting start flag is ensured, and eliminates the need for the use of a vertical sync signal for the display control by the host CPU.

The video signal processing system according to claim 2 of the present invention allows the versatility of an application program to be provided and the speed of display setting switching to be improved by mapping all display setting registers from the host CPU.

The video signal processing system according to claim 3 of the present invention allows some of the plurality of display setting registers set forth in claim 1 to be selected and updated at the timing of the vertical sync signal.

The video signal processing system according to claim 4 of the present invention allows some of the plurality of display setting registers set forth in claim 2 to be selected and updated at the timing of the vertical sync signal.

The video signal processing system according to claims 5 and 11 of the present invention allows the display setting register to be updated by following a procedure similar to that set forth in claim 1, and constantly holds two types of display setting patterns, and can switch between them.

The video signal processing system according to claim 6 of the present invention includes, in any of claims 2, 4, and 5, means for communicating information about input switching of a plurality of selectors to an external element, thereby eliminating the need for the use of a vertical sync signal for the display control performed by the host CPU.

The video signal processing system according to claim 7 of the present invention includes general memory accessible to the video signal processing system and a control circuit having the capability of accessing display setting registers and allows the display setting registers to be accessed without regard to vertical sync signal periods.

The video signal processing system according to claim 9 of the present invention can reduce the number of accesses to the registers by the host CPU if switching between a plurality sets of display settings is performed.

The video signal processing system according to claim 10 of the present invention gives priority to access from the register setting controller to first display setting registers over other accesses in a configuration where the first display setting registers are connected onto a bus and access to the memory including the first control registers group may otherwise be obtained for another use when updates are made to second display setting registers, thereby enabling efficient updates to the second display setting registers during a non-display period.

What is claimed is:

1. A video signal processing system provided between a host CPU and a monitor to update display setting data by said CPU, said video signal processing system comprising:

first display setting registers mapped into an address space for temporarily holding various display setting data under the control of a write control signal, said display setting data being generated and outputted asynchronously with a vertical sync signal;

a decoder for generating said write control signal associated with said first display setting registers for address access;

a second display setting register into which an output from said first display setting registers is inputted for updating data held in said second display setting register in synchronization with a first control signal;

a display output module for performing digital processing of a video display signal according to an output from said second display setting register; and a display setting start flag register in which a display setting start flag generated and outputted asynchronously with the vertical sync signal is set;

wherein said first control signal is generated by using the vertical sync signal and an output from said display setting start flag register and a display setting end flag register is provided for notifying said host CPU of the completion of update of said second display setting register.

2. A video signal processing system provided between a host CPU and a monitor to update display setting data by said CPU, said video signal processing system comprising:

first display registers and second display setting registers mapped into an address space for temporarily holding various display setting data under the control of write control signals, said display setting data being generated asynchronously with a vertical sync signal;

a decoder for generating said write control signals associated with said plurality of first and second display setting registers for address access;

selectors for switching between outputs according to an input, said input being a pair of outputs of said first and second display setting registers;

a display output module for performing digital signal processing of a video display signal according to an output from said selector; and a selector selection signal generator for controlling the switching performed by said selectors, said selector selection signal generator comprising a display control register having a first and second fields for temporarily holding display control information generated and outputted asynchronously with a vertical sync signal, and a flip-flop for holding an output from said second field with the timing of the vertical sync signal and the first field;

wherein the switching performed by said selectors is controlled by an output signal from said flip-flop, and display setting control data is set in the first and second fields under the control of a write strobe line, said write strobe line being an output of said decoder.

3. The video signal processing system according to claim 1, comprising a display control index register having fields corresponding to each of the plurality of second display setting registers into which an output from the first display setting registers is inputted for updating data held in the second display setting register in synchronization with a first control signal, wherein said first control signal corresponding to each of said plurality of second display setting registers is generated by using an output form said display control index register and said vertical sync signal, and said second display setting registers are updated by said first control signal.

4. The video signal processing system according to claim 2, comprising a display control index register having fields, each of said fields corresponding to each of said plurality of selectors, wherein said first control signals corresponding to said plurality of selectors are generated by using an output from said display control index register and said vertical sync signal, and said selectors select and output the output of said first display setting registers or the output of said second display setting registers according to said first control signals.

5. The video signal processing system according to claim 2, further comprising means for providing information about input switching performed by said plurality of selectors to an external element.

6. A video signal processing system provided between a host CPU and a monitor to update display setting data by said CPU, said video signal processing system comprising:

a plurality of pairs of first display setting registers and second display setting register, each of said pairs being assigned to one address;

a decoder for generating a plurality of write control signals associated with said plurality of pairs for address access;

a display control register for temporarily holding display control information externally generated and outputted asynchronously with a vertical sync signal; and a plurality of selectors for selecting an output from among outputs of said first display setting registers and said second display setting registers inputted into said selectors and outputting said output to a display output module;

wherein said first and second display setting registers select and hold various display setting data generated by a host CPU asynchronously with the vertical sync signal according to a first control signal and said write control signals;

said selectors select the output from among the outputs of said first display setting registers and said second display setting registers and output the selected output to the display output module in synchronization with a second control signal; and said first and second control signals are generated by using said vertical sync signal and an output from said display control register.

7. A video signal processing system provided between a host CPU and a monitor to update display setting data by said CPU, said video signal processing system comprising:

a plurality of first display setting registers mapped into an address space for temporarily holding various display setting data externally generated and outputted asynchronously with a vertical sync signal under the control of a write control signal;

display setting start flag register in which a display setting start flag indicating the completion of access to said plurality of first display setting registers is set, said display setting start flag being externally set asynchronously with the vertical sync signal;

a register setting controller for performing register access by using said display setting start flag and vertical sync signal;

a plurality of second display setting registers mapped into an address space for holding the various display setting data under the control of a write control signal, said data held in said plurality of second display setting registers being updated by said register setting controller;

a decoder for generating a plurality of said write control signals corresponding to said plurality of second display setting registers for address access;

a display setting end flag register in which a display setting end flag indicating the completion of update of said second display setting registers is set; and a display output module for performing digital processing of a video display signal according to an output from said plurality of second display setting registers;

wherein said register setting controller uses data in said plurality of first display setting registers to update said plurality of second display setting registers during a vertical synchronization period.

8. A video signal processing system provided between a host CPU and a monitor to update display setting data by said CPU, said video signal processing system comprising:

a plurality of first display setting registers mapped into an address space for temporarily holding various display setting data externally generated and outputted asynchronously with a vertical sync signal under the control of a write control signal;

a frame count detector for outputting an output indicating whether the current frame matches a frame count in a frame count setting register;

a register setting controller performing register access by using a display setting start flag indicating the completion of access to said plurality of first display setting registers and the vertical sync signal, said display setting start flag being externally set asynchronous with the vertical sync signal;

a plurality of second display setting registers mapped into an address space for holding the display setting data under the control of a write control signal, said data held in said plurality of second display setting registers being updated by said register setting controller;

a decoder for generating a plurality of the write control signals corresponding to the plurality of second display setting registers for address access;

a display setting end flag register in which a display setting end flag indicating the completion of update of said second display setting registers is set;

a display output module for performing digital processing of a video display signal according to an output from the plurality of second display setting registers;

wherein said frame count detector comprises:

a frame count setting register externally set asynchronously with the vertical sync signal for indicating update intervals of said plurality of first display setting registers;

a frame counter for counting frames by using the vertical sync signal; and a comparator for comparing an output from said frame count setting register with an output from said frame counter to determine whether the current frame matches the frame count in said frame count setting register, wherein said register setting controller and said frame count detector are constituted so that said register setting controller initializes the frame counter according to a setting in said display setting start flag, and said frame count detector holds said frame counter and transmits the vertical sync signal to said register setting controller until the display setting end flag is set after the output from said frame counter matches the output from said frame count setting register.

9. A video signal processing system provided between a host CPU and a monitor to update display setting data by said CPU, said video signal processing system comprising:

a plurality of first display setting registers mapped into an address space for temporarily holding various display setting data under the control of a write control signal, said display setting data being externally generated and outputted asynchronously with a vertical sync signal;

a display setting start flag register in which a display setting start flag indicating the completion of access to said plurality of first display setting registers is set, said display setting start flag being externally set asynchronously with the vertical sync signal;

a display setting selection register for indicating which set of said plurality of first display setting registers is used, said display setting selection register being externally set asynchronously with the vertical sync signal;

a register setting controller for performing register access by using said display setting start flag and vertical sync signal;

a plurality of second display setting registers mapped into an address space for holding the display setting data under the control of a write control signal, said data held in said plurality of second display setting registers being updated by said register setting controller;

a decoder for generating a plurality of said write control signals corresponding to said plurality of second display setting registers for address access; and a display output module for performing digital processing of a video display signal according to an output from said plurality of second display setting registers;

wherein said first display setting registers are capable of holding a plurality of sets of data held in said second display setting registers; and said register setting controller uses data among those data of said first display setting registers according to data set in said display setting selection register to update said second display setting registers.

10. A video signal processing system provided between a host CPU and a monitor to update display setting data by said CPU, said video signal processing system comprising:

a first display setting registers mapped into an address space for temporarily holding various display setting data under the control of a write control signal, said display setting data being externally generated and outputted asynchronously with a vertical sync signal;

a display setting start flag register in which a display setting start flag indicating the completion of access to said first display setting registers is set, said display setting start flag being externally set asynchronously with the vertical sync signal;

register setting controller for performing register access by using said display setting start flag and vertical sync signal;

a data bus used by said register setting controller and said host CPU for accessing said first display setting register;

a data bus arbiter for controlling the use of said data bus;

a second display setting registers mapped into an address space for holding the display setting data under the control of a write control signal, said data held in said plurality of second display setting registers being updated by said register setting controller;

a decoder for generating a plurality of said write control signals corresponding to said plurality of second display setting registers for address access; and a display output module for performing digital processing of a video display signal according to an output from said second display setting registers;

wherein said data bus arbiter is constituted so as to change the bus priority of said register setting controller to the highest priority in vertical synchronization periods.

11. A video signal processing system provided between a host CPU and a monitor to update display setting data by said CPU, said video signal processing system comprising:

a plurality of pairs of first display setting registers (24–28) and second display setting register, each of said pairs being assigned to one address;

a decoder for generating a plurality of write control signals corresponding to said plurality of pairs for address access;

a display control register for temporarily holding display control information externally generated and outputted asynchronously with a vertical sync signal;

a plurality of selectors for selecting an output from among outputs from said first display setting registers and said second display setting registers inputted into said selectors and outputting said output to a display output module;

wherein, it is constituted so that said first and second display setting registers select and hold various display setting data generated asynchronously with the vertical sync signal by a host CPU according to said write control signals, a control signal generated by using an output of said display control register and said vertical sync signal;

said selectors select the output from among the outputs from said first display setting registers and said second display setting registers and output the selected output to a display output module in synchronization with said vertical sync signal and the control signal generated by using the output of said display control register; and said first and second display setting registers are mutually exclusively selected to be updated by said host CPU and said first and second display setting registers are mutually exclusively selected by said selectors.

* * * * *